(12) United States Patent
Chai

(10) Patent No.: US 6,518,385 B1
(45) Date of Patent: Feb. 11, 2003

(54) HOMOPOLYMERS AND COPOLYMERS OF ETHYLENE

(75) Inventor: Choon Kooi Chai, Cabries (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/600,107

(22) Filed: Jul. 6, 2000

Related U.S. Application Data

(63) Continuation of application No. PCT/GB99/00021, filed on Jan. 5, 1999.

(30) Foreign Application Priority Data

Jan. 7, 1998 (GB) .............................................. 9800245

(51) Int. Cl.$^7$ ................................................ C08F 10/14
(52) U.S. Cl. ................................ 526/348.2; 526/348.4; 526/348.5; 526/348.6; 526/127
(58) Field of Search ............................ 526/348.4, 348.2, 526/348.5, 348.6, 901

(56) References Cited

U.S. PATENT DOCUMENTS 4,642,328 A    2/1987 Morterol et al.

FOREIGN PATENT DOCUMENTS

| EP | 0 659 773 | 6/1995 |
|---|---|---|
| EP | 0 743 327 | 11/1996 |
| WO | WO 95/04761 | 2/1995 |
| WO | WO 96/04290 | * 2/1996 |
| WO | WO 96/07680 | 3/1996 |
| WO | WO 96/16119 | 5/1996 |

* cited by examiner

*Primary Examiner*—David W. Wu
*Assistant Examiner*—William Cheung
(74) *Attorney, Agent, or Firm*—Finnegan, Henderson, Farabow, Garrett and Dunner, L.L.P.

(57) ABSTRACT

Ethylene homopolymers and copolymers having a broad molecular distribution, excellent toughness and improved processability. These polymers may be prepared by use of a single metallocene catalyst system in a single reactor in the gas phase. These polymers of density typically 0.85–0.95 are defined in particular by their melt strength (MS) and long chain branching (LCB) characteristics and are particularly suitable for use in low density film applications.

39 Claims, 10 Drawing Sheets

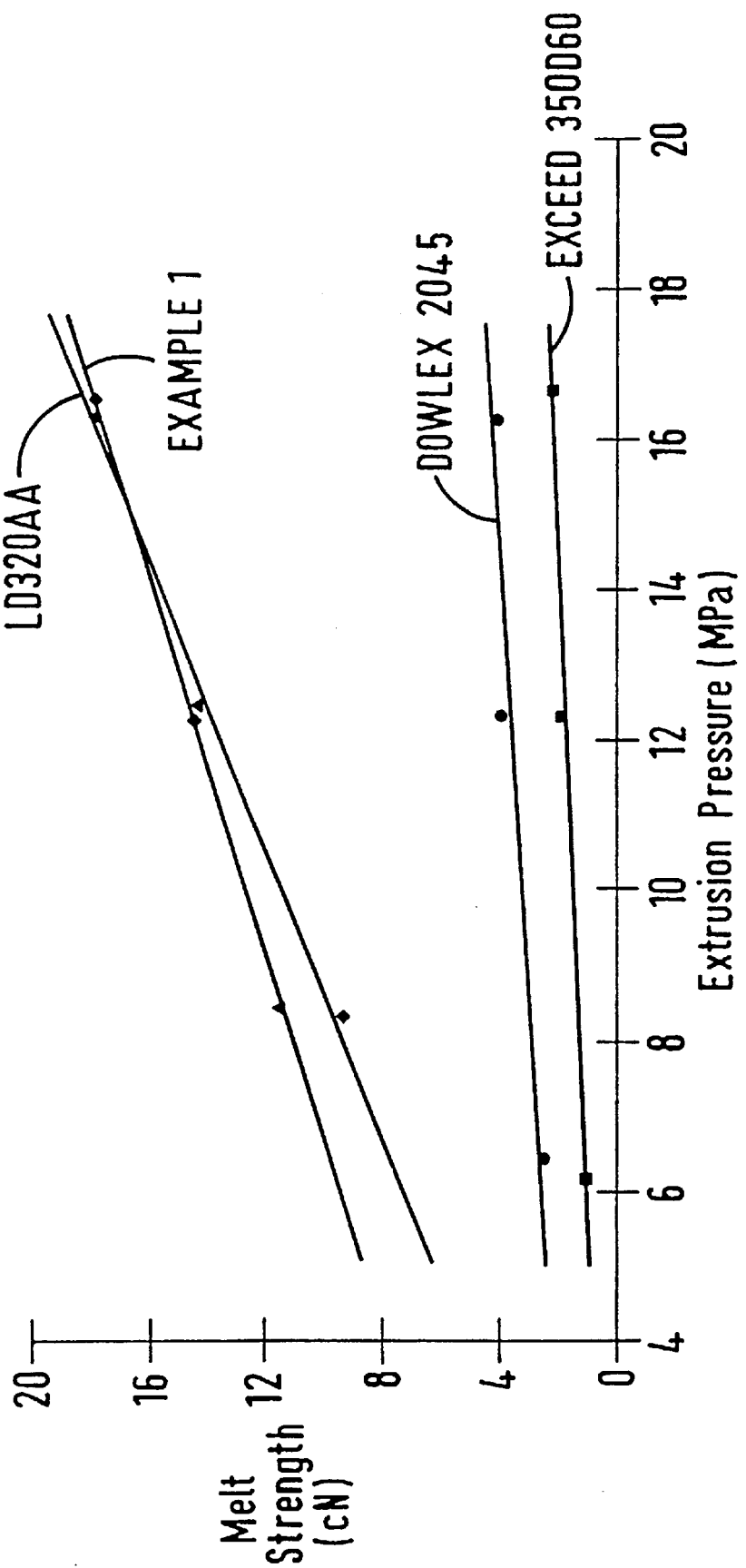

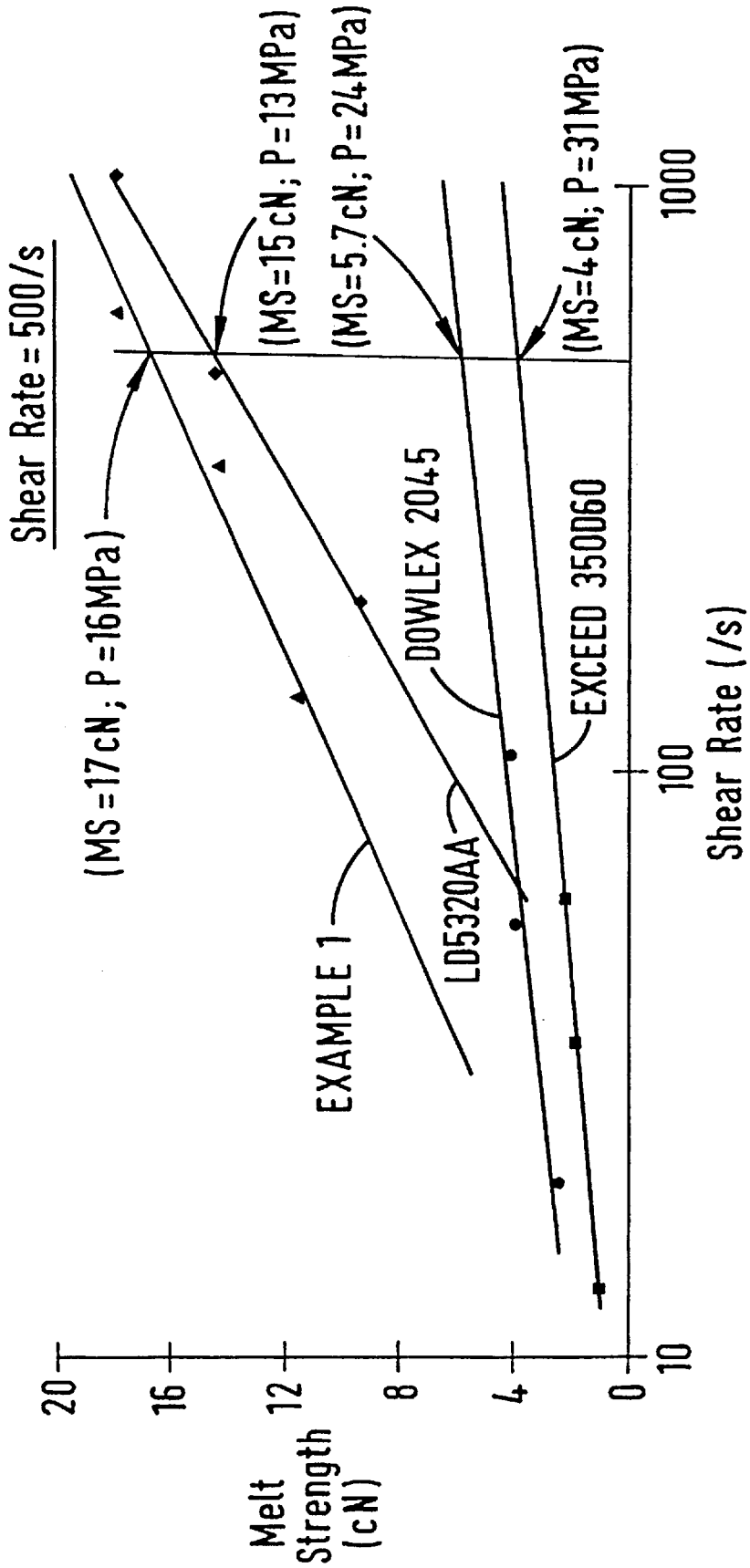
FIG. 2 PROCESSABILITY: Melt Strength 190°C

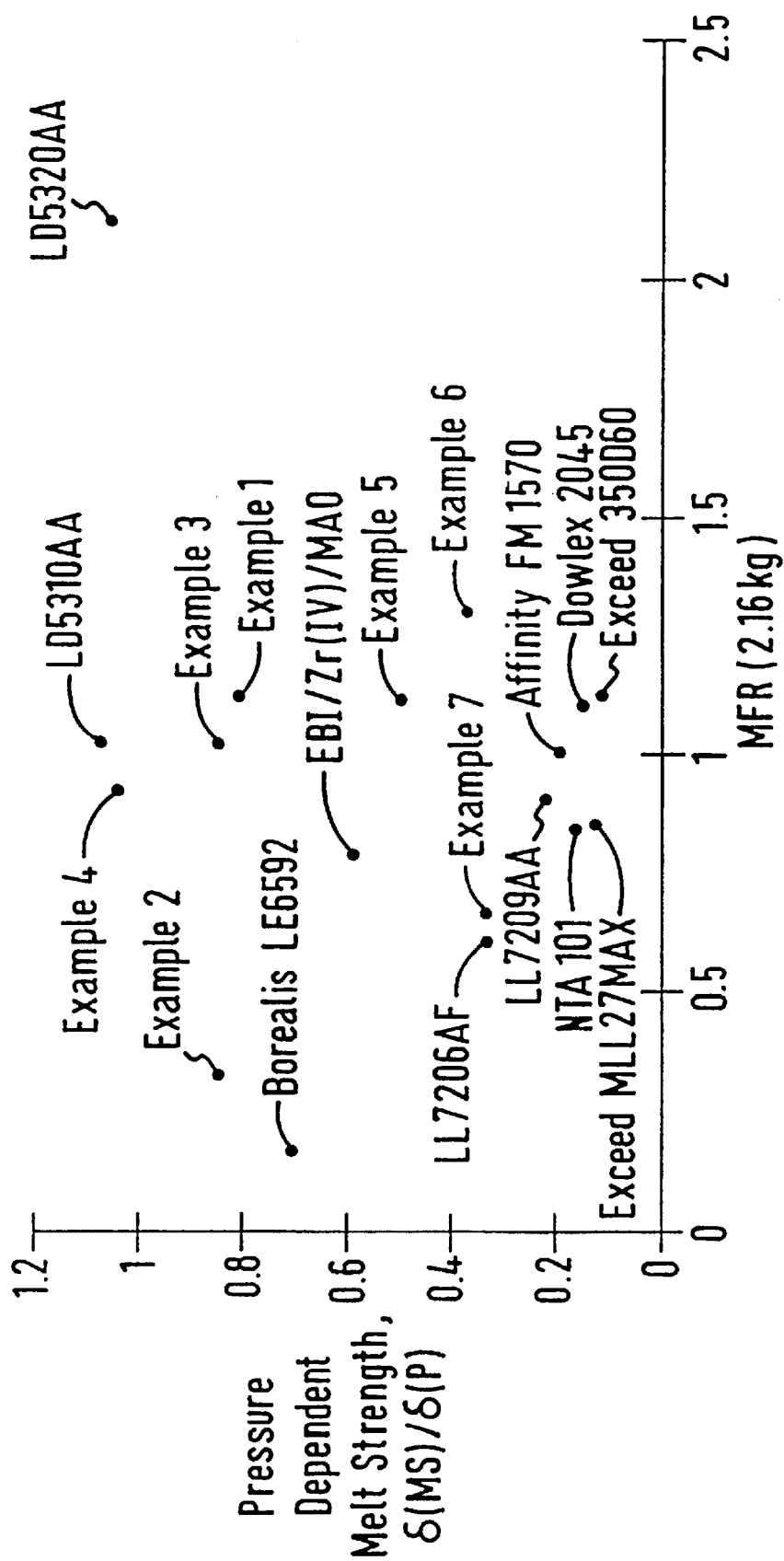

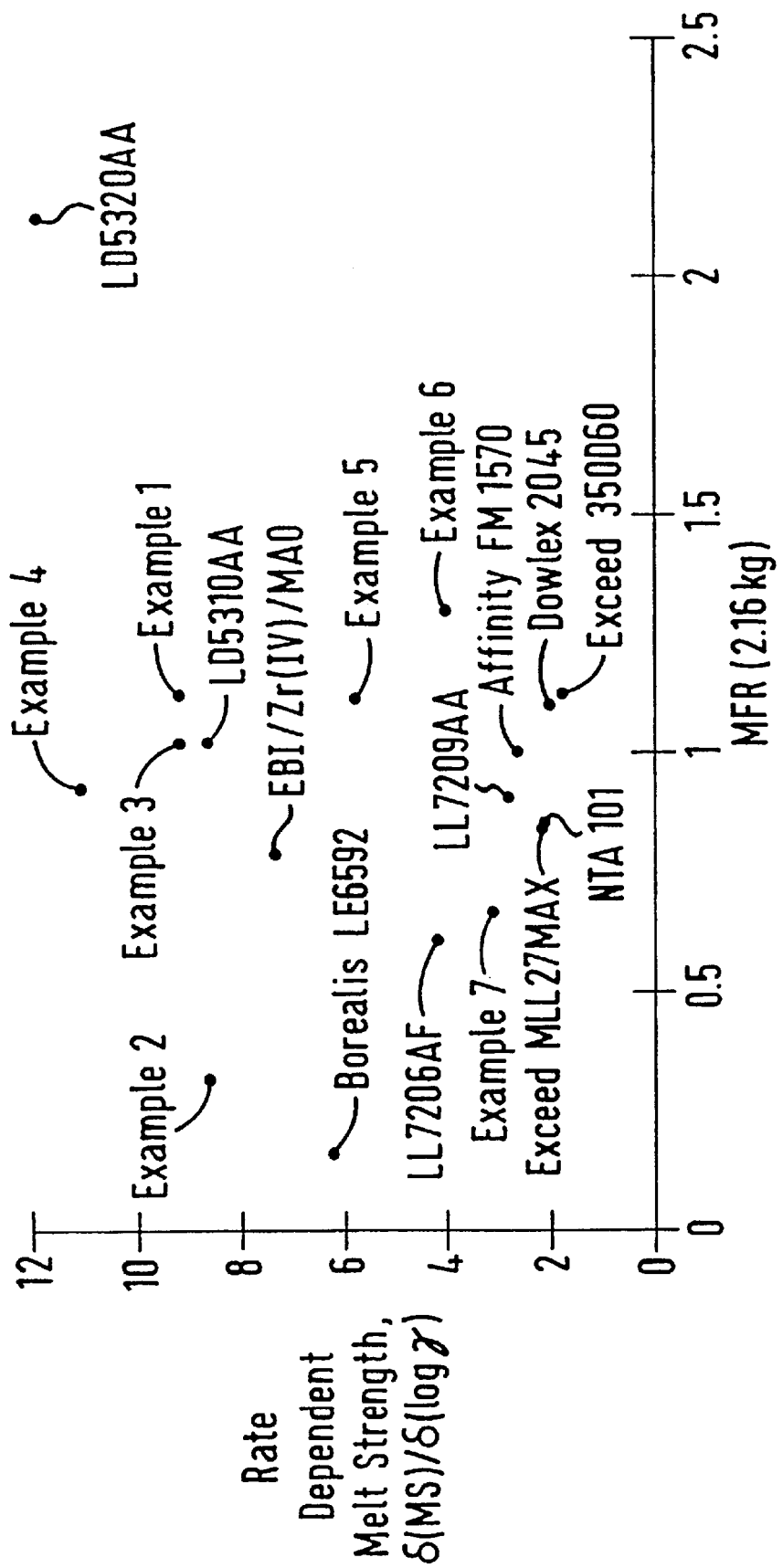
FIG. 4  Shear Rate Dependent MS vs MFR at 190°C

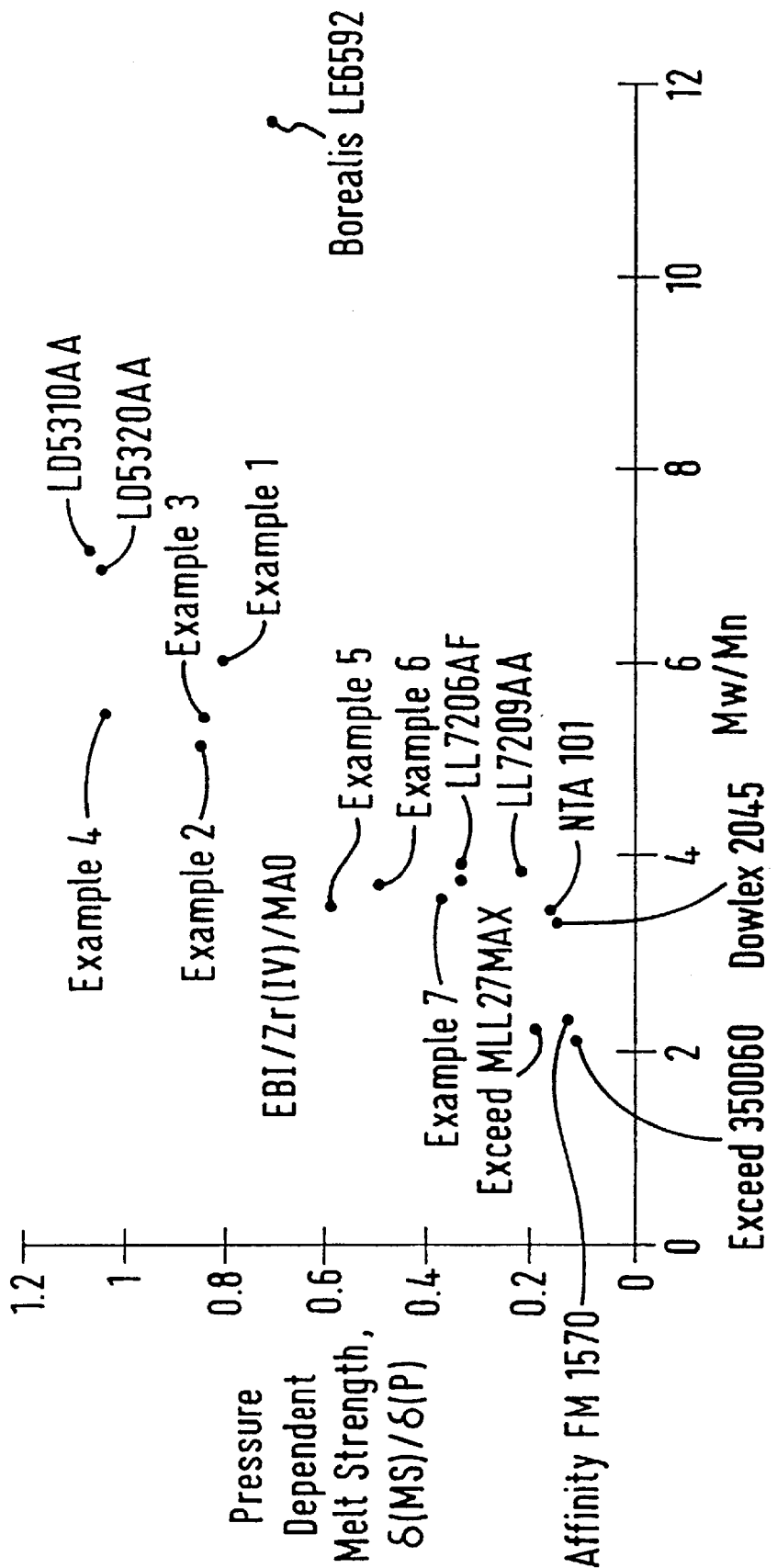

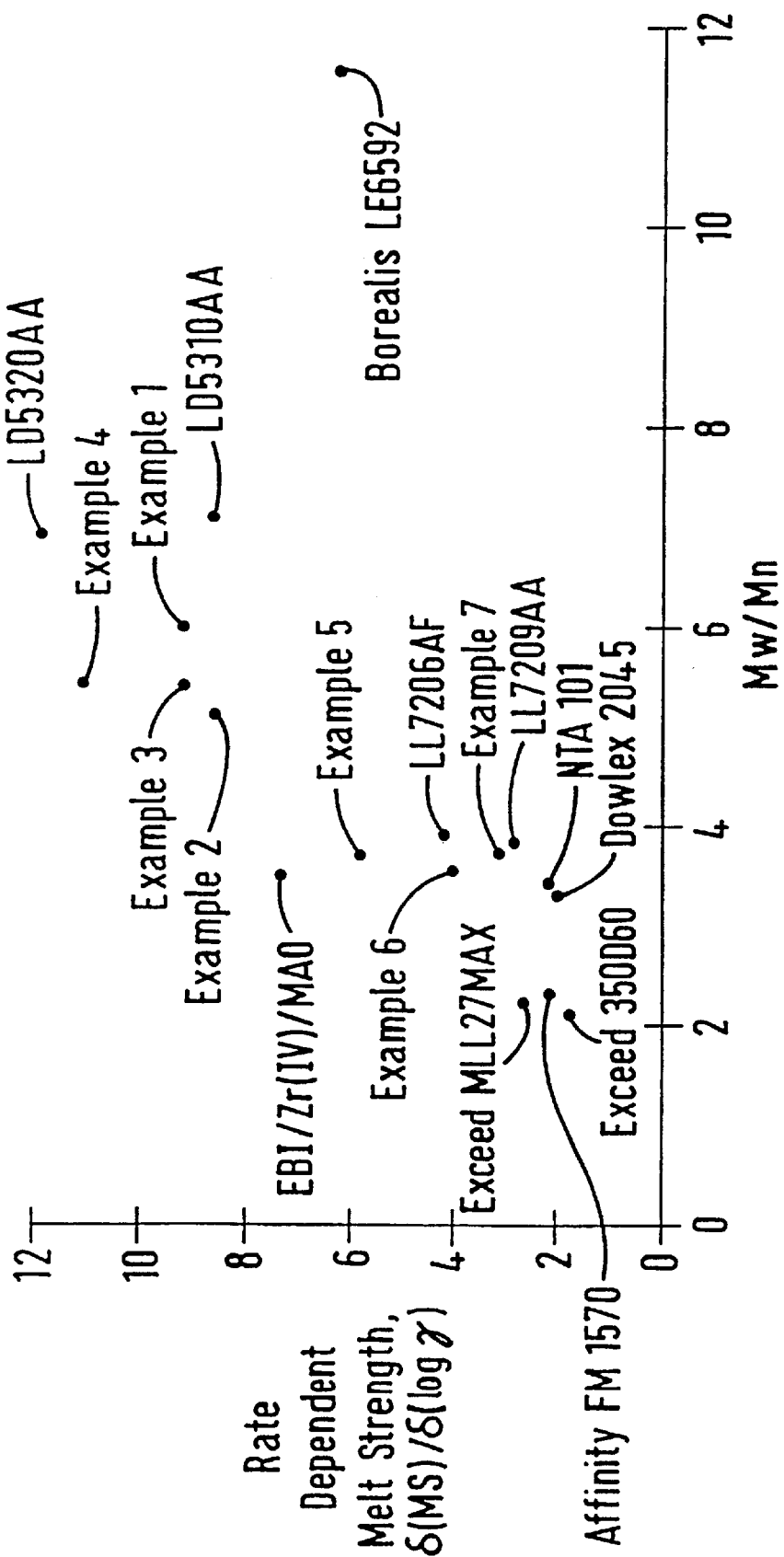

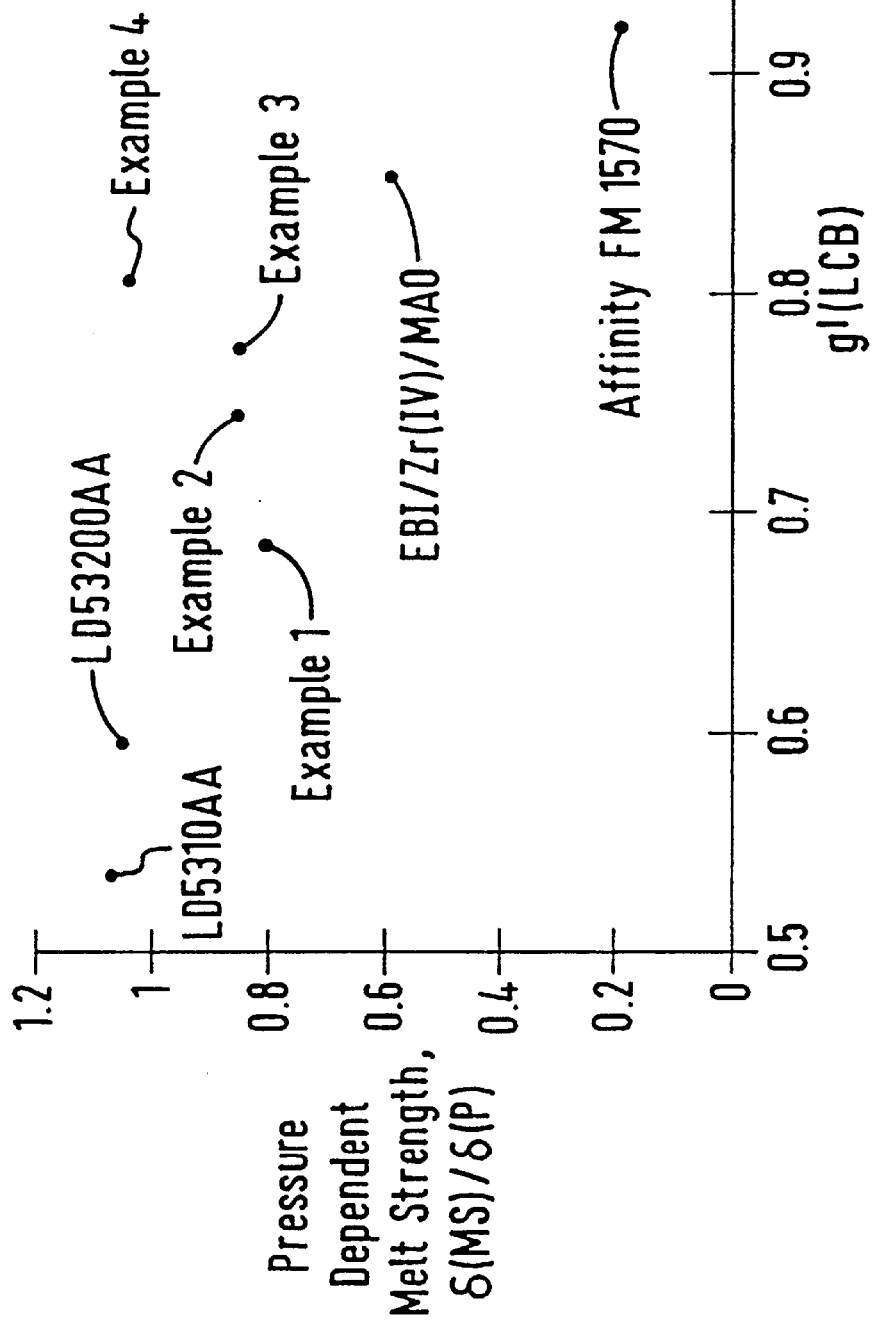
FIG. 7 Pressure Dependent Melt Strength vs g'(LCB) at 190°C

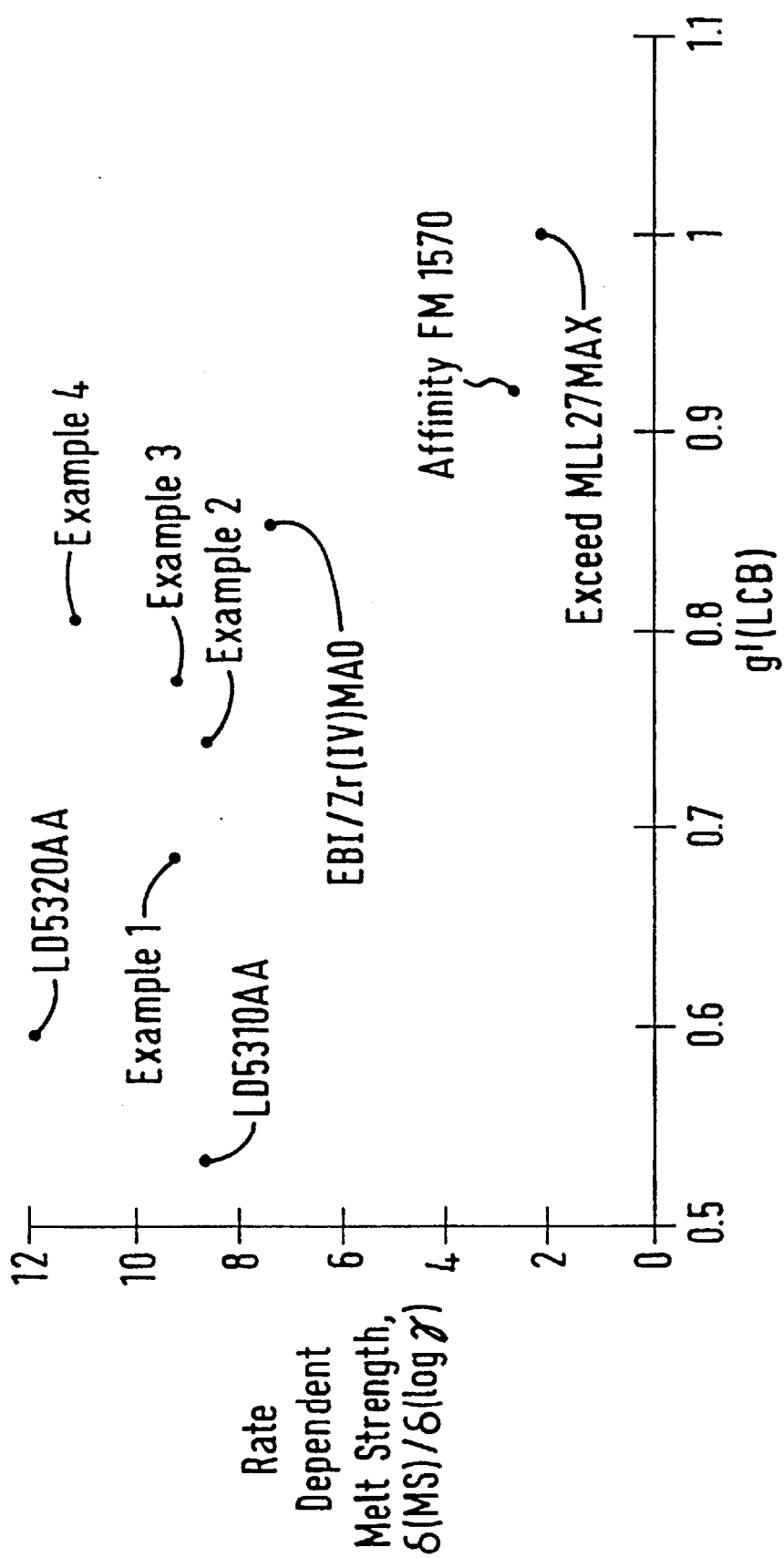

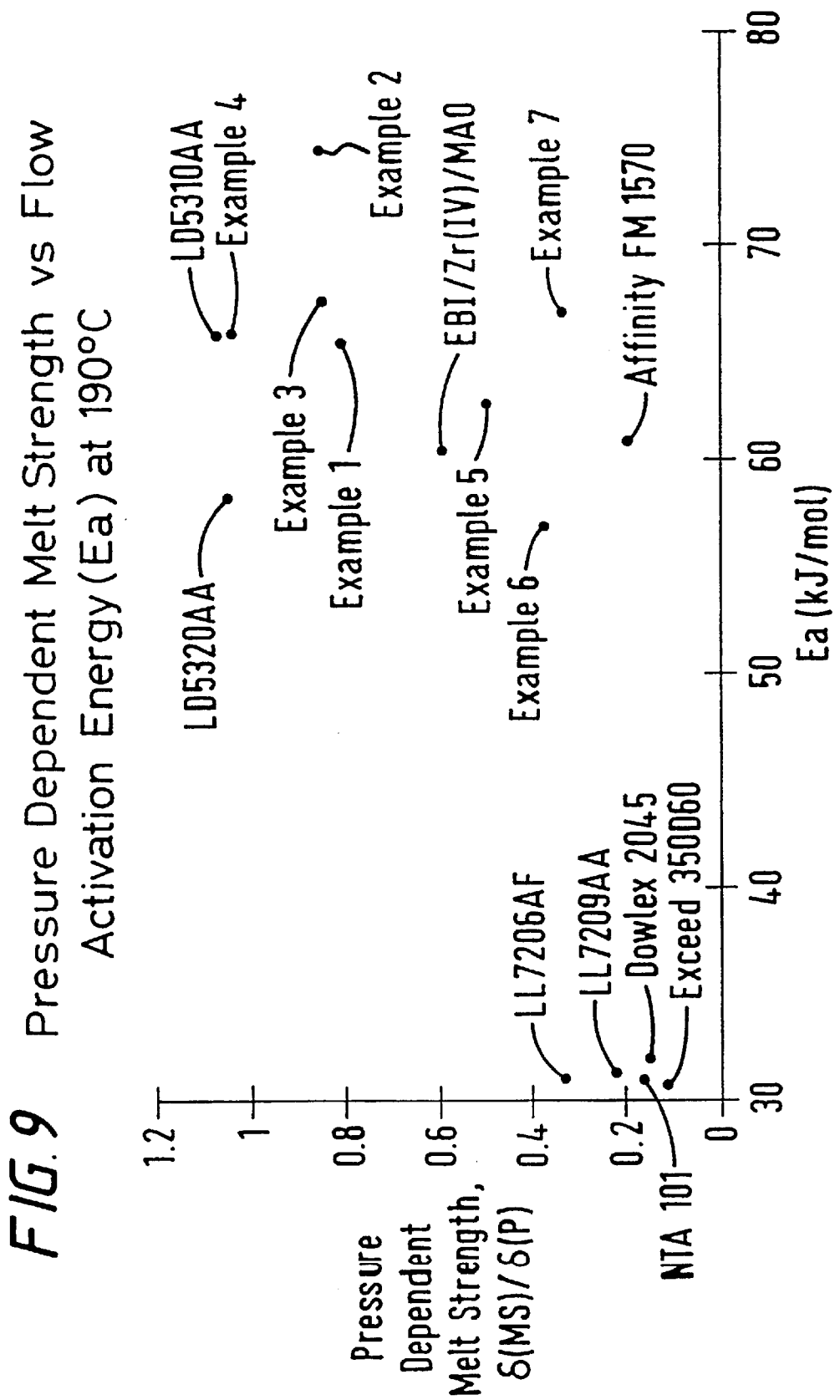

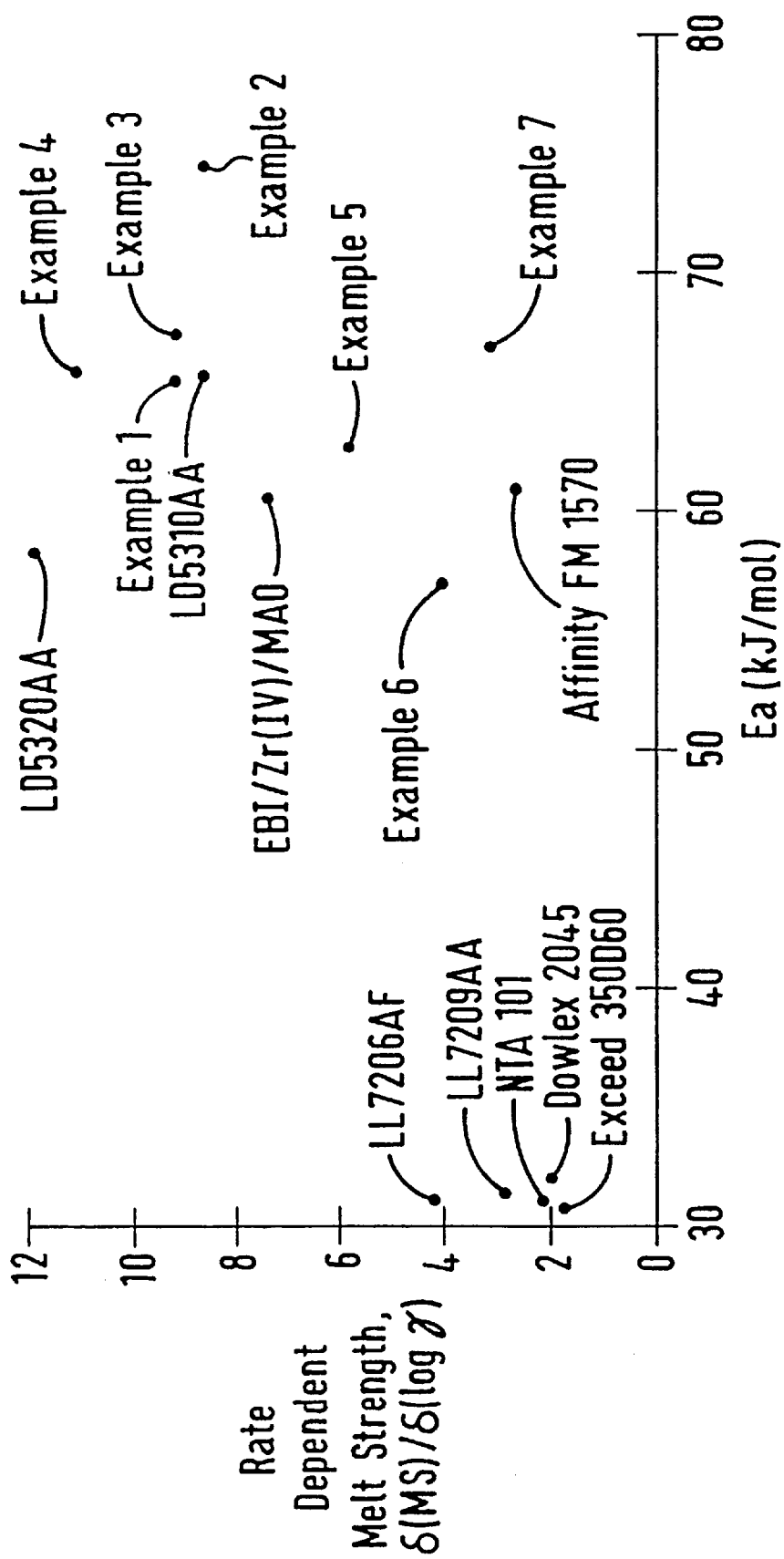
FIG. 10 Shear Rate Dependent Melt Strength vs Flow Activation Energy (Ea) at 190°C

HOMOPOLYMERS AND COPOLYMERS OF ETHYLENE

This application is a continuation of international application number PCT/GB99/00021 filed Jan. 5, 1999.

BACKGROUND OF THE INVENTION

The present invention relates to novel polymers and in particular to novel copolymers having a broad molecular weight distribution, toughness and improved processability.

In recent years there have been many advances in the production of polyolefin copolymers due to the introduction of metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts often are quite uniform in their molecular structure. For example, in comparison to traditional Ziegler produced materials, they have relatively narrow molecular weight distributions (MWD) and narrow Short Chain Branching Distribution (SCBD). Although certain properties of metallocene products are enhanced by narrow MWD, difficulties are often encountered in the processing of these materials into useful articles and films relative to Ziegler produced materials. In addition, the uniform nature of the SCBD of metallocene produced materials does not readily permit certain structures to be obtained.

An approach to improving processability has been the inclusion of long chain branching (LCB), which is particularly desirable from the viewpoint of improving processability without damaging advantageous properties. U.S. Pat. Nos. 5,272,236; 5,278,272; 5,380,810; and EP 659,773, EP 676,421, relate to the production of polyolefins with long chain branching.

Another approach is the addition of the polymer processing aids to the polymer prior to fabrication into films or articles. This requires extra processing and is expensive.

A different approach to the problem has been to make compositions which are blends or mixtures of individual polymeric materials with the aim being to maximize the beneficial properties of given component while minimising its processing problems. This also requires extra processing which increases the cost of materials produced. U.S. Pat. Nos. 4,598,128; 4,547,551; 5,408,004; 5,382,630; 5,383,631; and 5,326,602; and WO 94/22948 and WO 95/25141 relate to typical blends.

Another way to provide a solution for the processability problems and to vary SCBD has been the development of various cascade processes, where the material is produced by a series of polymerizations under different reactor conditions, such as in a series of reactors. Essentially, a material similar in some ways to a blend is produced, with a modality greater than one for various physical properties, such as the molecular weight distribution. While polyolefin compositions with superior processability characteristics can be produced this way, these methods are expensive and complicated relative to the use of a single reactor. Processes of interest are disclosed in U.S. Pat. No. 5,442,018, WO 95/26990, WO 95/07942 and WO 95/10548.

Another potentially feasible approach to improving processability and varying SCBD has been to use a multicomponent catalyst. In some cases, a catalyst which has a metallocene catalyst and a conventional Ziegler-Natta catalyst on the same support are used to produce a multimodal material. In other cases two metallocene catalysts have been used in polyolefin polymerizations. Components of different molecular weights and compositions are produced in a single reactor operating under a single set of polymerisation conditions. This approach is difficult from the point of view of process control and catalyst preparation. Catalyst systems of interest are disclosed in WO 95/11264 and EP 676,418.

WO96/04290 teaches the use of the preferred metallocene complexes of this invention to make ethylene copolymers. In particular, Examples 44 and 45 teach the preparation of polymer using gas-phase techniques. The examples teach only operation for a hour or less in batch mode and no details of the original polymer bed composition is given.

U.S. Pat. No. 5,462,999 and U.S. Pat. No. 5,405,922 teaches the preparation of ethylene copolymers in the gas-phase using a silica supported metallocene catalyst. It is believed, however, that the products produced by following the examples will not contain long chain branching and in particular will have lower values for the parameters $\delta(MS)/\delta(P)$ and $\delta(MS)/\delta(\log \dot{\gamma})$ than is claimed herein:

EP 676421 also teaches the preparation of copolymers in the gas phase using a supported metallocene catalyst. The products produced in the examples of this patent in general also have lower values for the parameters $\delta(MS)/\delta(P)$ and $\delta(MS)/(\log \dot{\gamma})$ than is claimed herein.

EP 452920 and EP495099 teach the production of ethylene copolymers using metallocene catalysts. Once again it is believed that the examples contained therein will not produce products with some or all of the desirable characteristics mentioned below It would be desirable to be able to produce a polyolefin copolymer composition which is very easy to process and which is produced using a single metallocene catalyst system preferably supported in a polymerisation process using a single reactor, preferably gas phase, operating semi-continuously or, preferably, continuously under a single set of reactor conditions.

It would also be desirable to produce polymers which have the processability and impact strength similar to highly branched low density polyethylene (LDPE).

It would also be highly desirable to produce polymers having the above properties which may be suitable for use in low density polyethylene film applications.

We have now found copolymers of ethylene and alpha olefins may be prepared which have improved processability and which exhibit specific melt strength characteristics. Such copolymers are advantageously prepared using a single metallocene catalyst system using a single gas-phase, fluidised bed reactor.

SUMMARY OF THE INVENTION

Thus according to a first aspect of the present invention there is provided a copolymer of ethylene and one or more alpha olefins containing from three to twenty carbon atoms said copolymer having:
 a) a long chain branching g' value of less than or equal to 0.9 and
 b) a value of the derivative function $\delta(MS)/\delta(P)$ of greater than 0.6
  wherein MS is the melt strength of the copolymer in cN and P is the extrusion pressure of the copolymer in MPa.

In a second aspect of the invention there is provided a copolymer of ethylene and one or more alpha olefins containing from three to twenty carbon atoms said copolymer having:

a) a long chain branching g' value of less than or equal to 0.9 and b) a value of the derivative function $\delta(MS)/(\log \dot{\gamma})$ of greater than 7.5
    wherein MS is the melt strength of the copolymer in cN and $\dot{\gamma}$ is the shear rate of the copolymer in secs$^{-1}$.

Also provided by the present is a homopolymer of ethylene or a copolymer of ethylene and one or more alpha olefins containing from three to twenty carbon atoms said homopolymer or copolymer having:

a) a value of the derivative function $\delta(MS)/\delta(P)$ of greater than 0.6 and b) an $M_w/M_n$ value of in the case of the copolymer less than 8 and in the case of the homopolymer less than 6
    wherein MS is the melt strength of the copolymer or homopolymer in cN and P is the extrusion pressure of the copolymer or homopolymer in MPa and $M_w/M_n$ is the ratio of weight average molecular weight to number average molecular weight of the copolymer or homopolymer as measured by gel permeation chromatography.

The derivative function value $\delta(MS)/\delta(P)$ is preferably $\geq 0.75$ and more preferably $\geq 0.8$.

In a further aspect of the present invention as herein described there is provided a homopolymer of ethylene or a copolymer of ethylene and one or more alpha olefins containing from three to twenty carbon atoms said homopolymer or copolymer having:

a) a value of the derivative function $\delta(MS)/\delta(\log \dot{\gamma})$ of greater than 7.5 and b) an $M_w/M_n$ value of less than 6.5
    wherein MS is the melt strength of the copolymer in cN and $\dot{\gamma}$ is the shear rate of the copolymer in secs$^{-1}$ and $M_w/M_n$ is the ratio of weight average molecular weight to number average molecular weight as measured by gel permeation chromatography.

Another aspect of the present invention is provided by a homopolymer of ethylene or a copolymer of ethylene and one or more alpha olefins containing from three to twenty carbon atoms, said homopolymer or copolymer having a long chain branching g' value of between about 0.6 and about 0.9. The homopolymers and copolymers of this aspect of the invention may also have either or both of (a) a value of the derivative function $\delta(MS)/\delta(P)$ of greater than 0.6 or (b) a value of the derivative function $\delta(MS)/\delta(\log \dot{\gamma})$ of greater than 7.5, wherein MS is the melt strength of the copolymer in cN and P is the extrusion pressure of the copolymer in MPa and $\gamma$ is the shear rate of the copolymer in secs$^{-1}$.

BRIEF DESCRIPTION OF THE DRAWINGS

The present invention will now be further illustrated with reference to the FIGS. which represent the preparation of copolymers according to the present invention.

FIG. 1 shows the variation in melt strength (MS) with extrusion pressure at 190° C.

FIG. 2 shows the variation in melt strength (MS) with shear rate at 190° C.

FIG. 3 shows the variation in $\delta(MS)/\delta(P)$ with melt flow rate (2.16 Kg) at 190° C.

FIG. 4 shows the variation in $\delta(MS)/\delta(\log \gamma)$ with melt flow rate (2.16 Kg) at 190° C.

FIG. 5 shows the variation in $\delta(MS)/\delta(P)$ with $M_w/M_n$ at 190° C.

FIG. 6 shows the variation in the $\delta(MS)/\delta(\log \gamma)$ with $M_w/M_n$ at 190° C.

FIG. 7 shows the variation in $\delta(MS)/\delta(P)$ with the long chain branching parameter g' at 190° C.

FIG. 8 shows the variation in $\delta(MS)/\delta(\log \gamma)$ with the long chain branching parameter g' at 190° C.

FIG. 9 shows the variation in $\delta(MS)/\delta(P)$ with flow activation energy (Ea) at 190° C.

FIG. 10 shows the variation in $\delta(MS)/\delta(\log \gamma)$ with flow activation energy (Ea) at 190° C.

DETAILED DESCRIPTION OF THE INVENTION

The homopolymers and copolymers of the present invention which are described above exhibit considerable rate advantages when processed for commercial use. Thus relative to those products known to date the homopolymers and copolymers of the present invention can be processed at lower melt temperature with lower melt pressure and lower power consumption than for previously known polymers of equivalent melt index. Alternatively for the same external conditions higher throughputs can be achieved.

The long chain branch parameter, g' may be calculated from gel permeation chromatography data (GPC) on-line viscometry data.

Although the present invention is not limited in all its aspects to homopolymers and copolymers possessing long chain branches, it is preferable that all the homopolymers and copolymers of the present invention have this feature. In such cases, the value of the long chain branching parameter g' for all the copolymers of the present invention should be less than 0.9, preferably less than 0.8, or alternatively preferably greater than 0.5. Preferably the parameter lies in the range about 0.5 to about 0.9 preferably in the range 0.55 to 0.85 more preferably in the range about 0.6 to about 0.8 and most preferably in the range 0.65 to 0.8. For the homopolymers the g' parameter should be in the range about 0.6 to about 0.9 more preferably 0.6 to 0.8 and most preferably 0.65 to 0.8.

As far as the melt strength (MS), extrusion pressure (P) and shear rate ($\dot{\gamma}$) parameters are concerned, the methods of measuring these for polymers are well known to those skilled in the art. By measuring the MS parameter it is possible to construct for example graphical relationships which allow the two derivative functions $\delta(MS)/\delta(P)$ and $\delta(MS)/\delta(\log \dot{\gamma})$ to be calculated. The melt strength (MS) and extrusion pressure at shear rate of 500/S may also be calculated in this way. Although the present invention is not limited in all its aspects to homopolymers and copolymers in which either or both of these derivative functions is a critical parameter, it is preferable that all the homopolymers and copolymers of the present invention meet at least one and preferably both of the following numerical constraints. As far as the derivative function $\delta(MS)/\delta(P)$ is concerned this should be greater than 0.6, desirably greater than 0.65, more desirably greater than 0.7 and most desirably greater than 0.80. Preferably the value of the derivative function $\delta(MS)/\delta(P)$ should be in the range greater than 0.6 to less than 1.5 more preferably from 0.65 to less than 1.4, even more preferably from 0.7 to 1.3 and most preferably from 0.8 to 1.2.

The derivative function $\delta(MS)/\delta(\log \dot{\gamma})$ should be greater than 7.5 desirably 7.75 or greater and more desirably 8.0 or greater. Preferably the value of this derivative function lies in the range greater than 7.5 to 15.0, more preferably from 7.75 to 13.0 and most preferably 8.0 to 12.0.

The copolymers according to the present invention may also be defined with respect to activation energy Ea as measured by dynamic rheometry. Thus according to another aspect of the invention there is provided a copolymer of ethylene and one or more alpha olefins containing from three to twenty carbon atoms said copolymer having:

(a) an activation energy, Ea, of value greater than or equal to 40 kJ/mol and (b) a value of the derivative function $\delta(MS)/\delta(P)$ of greater than 0.6
  wherein MS is the melt strength of the copolymer in cN and P is the extrusion pressure of the copolymer in MPa. Ea is measured by dynamic rheometry.

Preferably the value of the derivative function $\delta(MS)\delta(P)$ is greater than 0.65 and most preferably greater than 0.75.

The derivative function may also be represented by the relationship $$0.65 \leq \delta(MS)/\delta(P) \leq 1.4$$

and preferably $$0.7 \leq \delta(MS)/\delta(P) \leq 1.2.$$

In a further aspect of the invention there is provided a copolymer of ethylene and one or more alpha olefins containing from three to twenty carbon atoms said copolymer having:

(a) an activation energy, Ea of value greater than or equal to 40 kJ/mol and (b) a value of the derivative function $\delta(MS)/\delta(\log \dot{\gamma})$ of greater than 7.5
  wherein MS is the melt strength of the copolymer in cN and $\dot{\gamma}$ is the shear rate of the copolymer in $\text{secs}^{-1}$. Ea is measured by dynamic rheometry.

Preferably the value of the derivative function $\delta(MS)/\delta(\log \dot{\gamma})$ is greater than 7.5 and most preferably greater than 8.0.

The derivative function may also be represented by the relationship $$8.0 \leq \delta(MS)/\delta(\log \dot{\gamma}) \leq 12.$$

In normal polymer extrusion, for example in film processing, the throughput rate is usually high and the corresponding shear rate is expected to be in region of, or greater than, 500/s. The shear viscosity $\eta(500/s)$, extrusion pressure P(500/s) and melt strength MS(500/s), measured at shear rate of 500/s, using both the capillary rheometer and Rheotens, have thus been used to characterise the processability of polymer (Table 2). Although the present invention is not limited in all its aspects to homopolymers and copolymers in which these parameters are critical, it is preferable that all the homopolymers and copolymers of the present invention should have a MS(500/s) be greater than 13 cN desirably 15 cN and more desirably 16 cN or greater; a P(500/s) value should be less than or equal to 19 MPa desirably 18 MPa and more desirably 17.5 MPa or less; a $\eta(500/s)$ should be less than or equal to 430 Pa.s desirably 400 Pa.s and more desirably 300 Pa.s or less.

In another aspect of the invention there is provided a copolymer of ethylene and one or more alpha olefins containing from three to twenty carbon atoms said copolymer having:

(a) a long chain branching g' value of less than or equal to 0.9 and (b) a melt strength, MS(500/s) and extrusion pressure, P(500/s) satisfying the relationship:

$MS(500/s) >$ or $= P(500/s) - 4.5$ $MS(500/s) >$ or $= P(500/s) - 4$ desirably $MS(500/s) >$ or $= P(500/s) - 3.5$ more desirably wherein MS is the melt strength of the copolymer in cN and P is the extrusion pressure of the copolymer in MPa, all determined at shear rate of 500/s using a Rosand Capillary Rheometer and a Göttfert Rheotens.

In a further aspect of the invention there is provided a copolymer of ethylene and one or more alpha olefins containing from three to twenty carbon atoms said copolymer having:

(a) an activation energy, Ea, of value greater than or equal to 40 kJ/mol and (b) a melt strength, MS(500/s) and extrusion pressure, P(500/s) satisfying relationship:

$MS(500/s) >$ or $= P(500/s) - 4.5$ $MS(500/s) >$ or $= P(500/s) - 4$ desirably $MS(500/s) >$ or $= P(500/s) - 3.5$ more desirably wherein MS is the melt strength of the copolymer in cN and P is the extrusion pressure of the copolymer in MPa, all determined at shear rate of 500/s using a Rosand Capillary Rheometer and a Göttfert Rheotens. Ea is measured by dynamic rheometry.

Another aspect of the invention there is provided a copolymer of ethylene and one or more alpha olefins containing from three to twenty carbon atoms said copolymer having:

(a) a melt strength, MS(500/s) and $M_w/M_n$ value satisfying relationship:

$MS(500/s) >$ or $= 1.13(M_w/M_n) + 9.5$, and (b) a melt strength, MS(500/s) and extrusion pressure, P(500/s) satisfying relationship:

$MS(500/s) >$ or $= P(500/s) - 4.5$ $MS(500/s) >$ or $= P(500/s) - 4$ desirably $MS(500/s) >$ or $= P(500/s) - 3.5$ more desirably wherein MS is the melt strength of the copolymer in cN and P is the extrusion pressure of the copolymer in MPa, all determined at shear rate of 500/s using a Rosand Capillary Rheometer and a Göttfert Rheotens. Mw/Mn is the ratio of weight average molecular weight to number molecular weight as measured by gel chromatography.

Another aspect of the invention there is provided a copolymer of ethylene and one or more alpha olefins containing from three to twenty carbon atoms said copolymer having:

(a) a melt strength, MS(500/s) and Mw/Mn value satisfying relationship:

$MS(500/s) >$ or $= 1.13(Mw/Mn) + 9.5$, and (b) a melt strength, MS(500/s) and shear viscosity, $\eta(500/s)$ satisfying relationship:

$MS(500/s) >$ or $= 0.053\eta(500/s) - 4.0$ $MS(500/s) >$ or $= 0.053\eta(500/s) - 3.5$ desirably $MS(500/s) >$ or $= 0.053\eta(500/s) - 3.0$ more desirably wherein MS is the melt strength of the copolymer in cN and η is the shear viscosity of the copolymer in Pa.s, all determined at shear rate of 500/s using a Rosand Capillary Rheometer and a Göttfert Rheotens. Mw/Mn is the ratio of weight average molecular weight to number molecular weight as measured by gel chromatography.

The parameter $M_w/M_n$ is calculated from corresponding values for the weight average molecular weight $M_w$, and the number average molecular weight $M_n$ in turn obtained from gel permeation chromatography. Although the present invention is not limited in all its aspects to homopolymers and copolymers in which this parameter is critical, it is preferable that all the homopolymers and copolymers of the present invention should have an $M_w/M_n$ value of less than 8 preferably less than 7 more preferably less than 6.5 and most preferably less than 6.

Turning to other characteristics of the homopolymers and copolymers of the present invention, the density of these materials should be in the range 0.8 to 1.0 preferably 0.85 to 0.95 and most preferably 0.91 to 0.93. It is preferable that the melt flow ratio of the polymer measured at a load of 2.16 kg by standard techniques is in the range 0.01 to 100 and more preferably in the range 0.1 to 10 $dg.min^{-1}$. Typically the weight average molecular weight of the material is in the range 25,000 to 500,00 preferably 50,000 to 250,000 and most preferably 80,000 to 200,000. For the copolymers of the present invention it is preferable that they are comprised of between 2 and 30 weight η, most preferably between 5 and 20 weight % of units derived from the precursor comonomer.

The most preferable homopolymers and copolymers of the present invention appear to be characterised by molecular weight distributions (as measured by gel permeation chromatography) which show varying degrees of deviation from unimodality. In some instances these non unimodal characteristics are manifested in clear bimodality or even more complex distributions indicative of even higher orders of modality. This property is one which in particular has been seen before in connection with single site catalyst operating in a single reaction environment.

The homopolymers and copolymers of the present invention are suitably prepared by continuous polymerisation of the required monomer(s) in the presence of a single metallocene catalyst system in a single reactor. By the term continuous polymerisation is meant a process which for at least a significant period of time is operated with continuous feeding of the monomer(s) to the reactor in parallel with continuous or periodic withdrawing of homopolymer or copolymer product.

Preferably the continuous polymerisation is effected in the gas phase at elevated temperature in the presence of a fluidised bed of polymer particles and continuous recycle of unreacted monomer(s) around a loop joining the inlet and outlet of the reactor containing the fluidised bed. Examples of two possible approaches are described in EP 89961, U.S. Pat. No. 53,527,947 and U.S. Pat. No. 5,541,270 the complete texts of which are herein incorporated by reference. EP 699213 also illustrates a possible approach and again the complete text of this publication is incorporated by reference. The metallocene catalyst system comprises a metallocene complex and activating cocatalyst which in the case of a gas phase process is preferably supported on an inert carrier (e.g. silica). The catalyst system can be optionally prepolymerised and/or utilised in the presence of a Group IIIa metal alkyl scavenger such as an aluminium alkyl.

Suitable metallocene complexes which can be used to prepare the homopolymers and copolymers of the present invention comprise those organometallic complexes of the Group IVB (i.e. the titanium group) having between one and three $\eta^5$ bonded cylopentadienyl indenyl or fluorenyl ligands. Whilst these ligands may be unsubsituted or substituted at one or more of their carbon atoms with a substituent, including but not limited to alkyl groups having from one and ten carbon atoms, the most preferred metallocene complexes are those where at least two of the cyclopentadienyl, indenyl and fluorenyl ligands are connected together by a divalent bridging group e.g. an alkylene group having from one to eight carbon atoms or the corresponding silylene, germanylene derivatives. These alkylene, silylene and germanylene groups can in turn be substituted on the carbon and silicon backbone. Alternatively bridging can be effected by using a divalent phoshino or amino group the third valence of each being satisfied by an alkyl group having between one and eight carbons or phenyl (either substituted or unsubstituted).

The indenyl or fluorenyl ligands in such complexes may also be in the form of their hydrogenated derivatives.

Most preferred metallocene complexes are those having the following general formula:

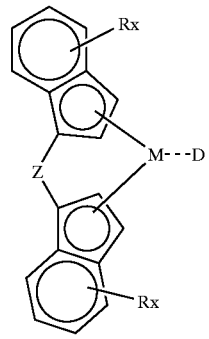

wherein

M is titanium, zirconium or hafnium,

D is a stable conjugated diene optionally substituted with one or more hydrocarbyl groups, silyl groups, hydro carbylsily groups, silylhydrocarbyl groups or mixtures thereof, or may contain a Lewis base functionality, said D having from 4 to 40 non-hydrogen atoms and forming a π-complex with M, Z is a bridging group comprising an alkylene group having 1–20 carbon atoms or a dialkyl silyl- or germanyl group or alkyl phosphine or amino radical, R is hydrogen or alkyl having from 1–10 carbon atoms, and x is 1–6.

Most preferred metallocene complexes in this family are those where, as evidenced by X-ray diffraction or NMR, the D ligand is π-bonded to the M atom in an $\eta^3$ fashion. Such metallocene complexes are characterised by the M atom being in the +2 oxidation state.

Preferred complexes are those wherein M is zirconium and Z is ethylene ($CH_2CH_2$).

The D ligand is most preferably chosen from the group:
s-trans-$\eta^4$,4-diphenyl-1,3-butadiene; s-trans-$\eta^4$-3-methyl-1,3-pentadiene; s-trans-$\eta^4$-1,4-dibeizy-1,3-butadiene; s-trans-$\eta^4$-2,4-hexadiene; s-trans-$\eta^4$-1,4-ditolyl-1,3-butadiene; s-trans-$\eta^4$-1,4-bis(trimethylsilyl)-1,3-butadiene; scis-$\eta^4$-1,4-diphenyl-1,3-butadiene; s-cis-$\eta^4$-3-methyl-1,3-pentadiene; s-cis- η$^4$-2,4-hexadiene; s-cis-η$^4$2,4-hexadiene; s-cis-η$^4$1,3-pentadiene; s-cis-η$^4$-1,4-ditolyl-1,3-butadiene; and s-cis-η$^4$-1,4-bis(trimethylsilyl)-1,3-butadiene, said s-cis diene group forming a π-complex as defined herein with the metal.

Particularly suitable are externally substituted dienes in particular the 1,4-diphenyl substituted butadienes.

The preparation of these complexes is extensively described in WO 96/04290 which also lists examples of suitable representatives for use in the present invention.

When the diene group D has a Lewis base functionality this may be chosen from the following groups:

—NR$_2$, —PR$_2$, —AsR$_2$, —OR, —SR

Particularly preferred dienes of this type are dialkylarnino phenyl substituted dienes for example 1-phenyl-4(N,N$^1$-diethylamino phenyl)1,3-butadiene.

The most preferred complex is ethylene bis(indenyl) zirconium (II) 1,4-diphenyl butadiene having the following formula:

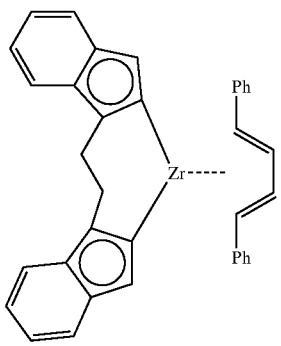

Also preferred is the hydrogenated analogue—ethylene bis(tetrahydroindenyl) zirconium (II) 1,4-diphenyl butadiene.

The activating cocatalysts suitable for use with the above metallocene complexes are preferably tri(hydrocarbyl) boranes in particular trialkylboranes or triarylboranes. Most preferred cocatalysts are perfluorinated tri(aryl) boron compounds and most especially tris(pentafluorophenyl) borane. Other activators include borate salts of a cation which is a Bronsted acid capable of donating a proton to one of the ligands on the metallocene complex. The potential scope of both these types of activators is illustrated in WO 96/04290 the relevant sections of which are herein incorporated by reference.

Another type of activator suitable for use with the metallocene complexes of the present invention are the reaction products of (A) ionic compounds comprising a cation and an anion wherein the anion has at least one substituent comprising a moiety having an active hydrogen and (B) an organometal or metalloid compound wherein the metal or metalloid is from Groups 1–14 of the Periodic Table.

Suitable activators of this type are described in WO 98/27119 the relevant portions of which are incorporated by reference.

A particular preferred activator of this type is the reaction product obtained from allylammonium tris (pentafluorophenyl) 4-(hydroxyphenyl) borates and trialkylamines. For example a preferred activator is the reaction product of bis(hydrogenated tallow alkyl) methyl ammonium tris (pentafluorophenyl) (4-hydroxyphenyl) borate and triethylamine.

The molar ratio of metallocene complex to activator employed in the process of the present invention may be in the range 1:10000 to 100:1. A preferred range is from 1:5000 to 10:1 and most preferred from 1:10 to 10:1.

The metallocene catalysts system suitable for use in the present invention is most suitably supported. Typically the support can be any organic or inorganic inert solid. However particularly porous supports such as talc, inorganic oxides and resinous support materials such as polyolefins which have well-known advantages in catalysis are preferred. Suitable inorganic oxide materials which may be used include Group 2, 13, 14 or 15 metal oxides such as silica, alumina, silica-alumina and mixtures thereof Other inorganic oxides that may be employed either alone or in combination with the silica, alumina or silica-alumina are magnesia, titania or zirconia. Other suitable support materials may be employed such as finely divided polyolefins such as polyethylene.

The most preferred support material for use with the supported catalysts according to the process of the present invention is silica. Suitable silicas include Crossfield ES70 and Davidson 948 silicas.

It is preferable that the silica is dried before use and this is typically carried out by heating at elevated temperatures for example between 200 and 850 deg. C.

In another aspect of the present invention homopolymers of ethylene or copolymers of ethylene and one or more alpha-olefins containing from three to twenty carbon atoms may be prepared in the presence of a single metallocene catalyst comprising a metallocene complex and an activating cocatalyst wherein the activating cocatalyst is not an alkyl aluminoxane for example methyl aluminoxane (MAO).

In such cases there is thus provided a copolymer of ethylene and one or more alpha-olefins containing from three to twenty carbon atoms said copolymer having:

(a) a long chain branching g' value of less than or equal to 0.9 and (b) a value of the derivative function δ(MS)/δ(log γ̇) and a Mw/Mn satisfy the relationship:

log [δ(MS)/δ(log γ̇)]≧0.6 log (Mw/Mn)+0.3 wherein Mw/Mn is the ratio of weight average molecular weight to number molecular weight as measured by gel chromatography.

Such polymers may also be defined by:

(a) a long chain branching g' value of less than or equal to 0.9 and (b) a value of the derivative function δ(MS)/δ(P) and Mw/Mn which satisfy the relationship:

δ(MS)/δ(P)≧0.12 Mw/Mn wherein Mw/Mn is the ratio of weight average molecular weight to number molecular weight as measured by gel chromatography.

The polymers may also be defined with respect to the flow activation energy Ea as follows:

(a) an flow activation energy, Ea, of value greater than or equal to 40 kJ/mol and (b) a value of the derivative function δ(MS)/δ(log γ̇) and a Mw/Mn which satisfy the relationship:

log [δ(MS)/δ(log γ̇)] ≥ 0.6 log (Mw/Mn)+0.3 wherein Mw/Mn is the ratio of weight average molecular weight to number molecular weight as measured by gel chromatography. Ea is measured by dynamic rheometry. Alternatively the polymers may be defined by:
(a) an flow activation energy, Ea, of value greater than or equal to 40 kJ/mol and
(b) a value of the derivative function δ(MS)/δ(P) and Mw/Mn which satisfy the relationship:

δ(MS)/δ(P) ≥ 0.12 Mw/Mn wherein Mw/Mn is the ratio of weight average molecular weight to number molecular weight as measured by gel chromatography. Ea is measured by dynamic rheometry.

The polymer may be defined by:
(a) a long chain branching g' value of less than or equal to 0.9 and
(b) a value of the derivative function δ(MS)/δ(P) and a flow activation energy Ea satisfy the relationship:

Log [δ(MS)/δ(P)] ≥ 3.7−2.4 log (Ea)

wherein Ea is measured by dynamic rheometry.

Such polymers may also be defined by:
(a) a long chain branching g' value of less than or equal to 0.9 and
(b) a value of the derivative function δ(MS)/δ(log γ̇) and a flow activation energy Ea satisfy the relationship:

Log [δ(MS)/δ(log γ̇)] ≥ 2.75−1.25 log (Ea)

wherein Ea is measured by dynamic rheometry.

The copolymers of the present invention are copolymers of ethylene with one or more alpha-olefins having from three to twenty carbon atoms. Preferably the alpha-olefin has between three and ten carbon atoms most preferably three and eight. Examples of the most preferred alpha olefins include 1-butene, 1-hexene, 4-methyl-1-pentene, 1-octene. Particular suitable are copolymers of ethylene with 1-hexene or 4-methyl-1-pentene.

Fabricated articles made from the novel polymers of the present invention may be prepared using conventional polyolefin processing techniques. Suitable articles of this type include film (eg cast, blown etc) fibres and moulded articles (eg produced using injection moulding, blow moulding or rotomoulding processes).

Other useful compositions are also possible comprising the novel polymers of the present invention and at least one other natural or synthetic polymer. Such compositions may be formed by conventional methods for example dry blending. Other suitable processing techniques may be used to prepare such compositions comprising the novel polymers of the present invention.

The novel polymers of the present invention may suitably be used for the manufacture of films and specific details of the film properties and given below in the examples.

In particular the novel polymers of the present invention may be used to prepare films having a dart impact value as measured by ASTM D1709 (method A) of greater than 100 and up to about 2000. Such films comprise copolymers of the invention of density 0.910–0.930, a $I_{21}/I_2$ value of ≥35 and a long chain branching $g^1$ value of less than or equal to 0.9. In addition the copolymers exhibit the melt strength characteristics defined in detail above.

In particular they exhibit a value of the derivative function δ(MS)/δ(P) of ≥0.6. Alternatively they may also exhibit a value of the derivative function δ(MS)/δ(P) and flow activation Ea of log [δ(MS)/δ(P)] ≥ 3.7−2.4 log Ea.

Such polymers also exhibit a flow activation Ea of ≥40.

The present invention will now be further illustrated with reference to the following examples which represent the preparation of copolymers according to the present invention and a comparison with commercially available prior art materials.

Table 2 sets out a range of relevant physical information for seven examples according to the present invention and examples of eleven commercially available or representative prior art materials.

The terms 'Exceed', 'Affinity', and 'Dowlex' are registered trade marks and herein recognised as such. Affinity FM1570, Exceed ML27MAX, Exceed 350D60, Dowlex 2045, NTA 101, LL7206AF, LL7209AA, LD 5320AA, LD5310AA, and Borealis LE 65 92 are all commercially available products whose origin will be known to those skilled in the art. EBI/Zr(IV)MAO is an experimental material produced according to EP 676421.

The following analytical procedures were used in order to characterise the novel polymers of the present invention and to compare said polymers with the prior art and commercially available materials.

1. Rheological Characterisation 1.1 Capillary Rheometry

The shear capillary viscosities of the polymers were measured at 190° C., using a Rosand RH 7 twin-bore capillary rheometer, with two 1.0 mm diameter dies: one with die length of 16 mm while the other has a (zero) die length of 0.25 mm. The die entry angle for both dies is 190°. All data are corrected for the effects of die entry & exit pressures (Bagley correction) and of non-Newtonian flow (Rabinowitsch correction). The shear viscosity at shear rate of 500/S, η(500/S) is then extracted from the corrected flow curve.

1.2 Rheotens Extensional Rheometry

The melt strength of the polymer is measured at 190° C., using a Göttfert Rheotens extensional rheiometer in conjunction with a Rosand RH 7 Capillary Rheometer. This is achieved by extruding the polymer at a constant pressure (P) through a die of 1.5 mm diameter and 30 mm in length, with a 90° entry angle.

Once a given extrusion pressure is selected, the piston of the capillary rheometer will travel through its 15 mm diameter barrel at a speed that is sufficient to maintain that pressure constant using the constant pressure system of the rheometer. The nominal wall shear rate (γ̇) for a given extrusion pressure can then be computed for the polymer at the selected pressure. The extrudate is drawn with a pair of gear wheels at an accelerating speed (V). The acceleration ranges from 0.12 to 1.2 $cm/s^2$ depending on the flow properties of the polymer under test. The drawing force (F) experienced by the extrudate is measured with a transducer and recorded on a chart recorder together with the drawing speed. The maximum force at break is defined as melt strength (MS) at a constant extrusion pressure (P) or at its corresponding extrusion rate ($\dot{\gamma}$). Three or four extrusion pressures (6, 8, 12, 16 MPa) are typically selected for each polymer depending on its flow properties. For each extrusion pressure, a minimum of 3 MS measurements are performed and an average MS value is then obtained.

The derivative functions of the extrusion pressure and shear rate dependent melt strengths, $\delta(MS)/\delta(P)$ and $\delta(MS)/\delta(\log \dot{\gamma})$, for each polymer are computed from the slopes (by a least square line fitting) of the plots of the average MS against pressure and against shear rate respectively. The melt strength and extrusion pressure at shear rate of 500/s, (MS(500/s), P(500/s) respectively, were also computed from these plots. (See FIGS. 1–2).

1.3 Melt Flow Rate (2.16 keg)

The melt flow rate (MFR) of the polymers was measured under conditions which conform to ISO 1133 (1991) and BS 2782:PART 720A:1979 procedures. The weight of polymer extruded through a die of 2.095 mm diameter, at a temperature of 190° C., during a 600 second time period and under a standard load of 2.16 kg is recorded.

2. Molecular Structure Characterisation

Various techniques (eg $^{13}C$ NMR, GPC/LALLS, GPC/intrinsic viscosity, GPC/on-line viscometry and rheological flow activation energy, etc) have been developed to indicate the presence of long chain branching in polymers.

2.1 Molecular Weight Distribution ($M_w/M_n$) and Long Chain Branching (LCB) Measurements by GPC/On-line Viscometry Molecular weight distribution was determined by gel permeation chromatography/on-line viscometry (GPC/OLV) using a Waters 150CV. The method followed was based upon that described by J. Lesec et al, Journal of Liquid Chromatography, 17, 1029 (1994). It is well known to those skilled in the art that this technique can provide an estimate of long chain branching (LCB) content as a function of molecular weight. While it is possible to interpret the data in terms of the number of long chain branches per 1000 carbon atoms, an alternative approach is to interpret the data in terms of the parameter g' which is the ratio of the measured intrinsic viscosity to that of a linear polymer having the same molecular weight. Linear molecules show g' of 1, while values less than 1 indicate the presence of LCB. As always, the reliability of LCB determinations can be greatly strengthened by combining results from several techniques rather then relying on a sole method.

Average values of g' were calculated from the equation $<g'>_{LCB}=[\eta]/[\eta]_{lin}$ where $[\eta]=\Sigma(w_i[\eta]_i$, and $[\eta]_{lin}=\Sigma(w_i[\eta]_{i,lin}$ where $w_i$ is the weight fraction, $[\eta]_i$ are measured intrinsic viscosities of the long chain branched polymer fractions, and $[\eta]_{i,lin}$ are the intrinsic viscosities of the equivalent linear polymers of the same molecular weight for each slice, all calculated from the slice data of the GPC/OLV experiment. The averaging was carried out over the range of molecular weight for which reliable measures of $[\eta]_i$ could be made. The data were not corrected for any contribution to g' due to short chain branching. A molecular weight distribution corrected for LCB and molecular weight averages corrected for LCB were calculated in the normal manner. For some analyses of polymers known not to contain LCB the on-line viscometer was not used and uncorrected data are reported and hence for these no $<g^1>$LCB value is given.

Flow Activation Energy (Ea) Measurement

Rheological measurements were carried out on a Rheometrics RDS-2 with 25 mm diameter parallel plates in the dynamic mode. Two strain sweep (SS) experiments were initially carried out to determine the linear viscoelastic strain that would generate a torque signal which is greater than 10% of the full scale (2000 g-cm) of the transducer over the full frequency (eg 0.01 to 100 radis) and temperature (eg 170° to 210° C.) ranges. The first SS experiment was carried out at the highest test temperature (eg 210° C.) with a low applied frequency of 0.1 rad/s. This test is used to determine the sensitivity of the torque at low frequency. The second experiment was carried out at the lowest test temperature (eg 170° C.) with a high applied frequency of 100 rad/s. This is to ensure that the selected applied strain is well within the linear viscoselastic region of the polymer so that the oscillatory theological measurements do not induce structural changes to the polymer during testing. This procedure was carried out for all the samples.

The bulk dynamic theological properties (eg G', G" and $\eta^*$) of all the polymers were then measured at 170°, 190° and 210° C. At each temperature, scans were performed as a function of angular shear frequency (from 100 to 0.01 rad/s) at a constant shear strain appropriately determined by the above procedure.

The dynamic theological data was then analysed using the Rheometrics RHIOS V4.4 Software. The following conditions were selected for the time-temperature (t-T) superposition and the determination of the flow activation energies ($E_a$) according to an Arrhenius equation, $a_T=\exp(E_a/kT)$, which relates the shift factor ($a_T$) to $E_a$:

| | |
|---|---|
| Rheological Parameters: | G'($\omega$), G"($\omega$) & $\eta^*$($\omega$) |
| Reference Temperature: | 190° C. |
| Shift Mode: | 2D (ie horizontal & vertical shifts) |
| Shift Accuracy: | High |
| Interpolation Mode: | Spline |

The copolymers of the present invention may also be described with reference to melt flow ratio which is the ratio of $I_{21}/I_2$ wherein $I_{21}$ is measured at 190° C. in accordance with ASTM-D-1238 Condition E.

Copolymers according to the invention have a $I_{21}I_2$ value of $\geq 35$, preferably $\geq 40$.

EXAMPLE 1

Preparation and Use of Zr (II) Polymerisation Catalyst (i) Treatment of Silica

A suspension of Crossfield ES70 silica (20 kg, previously calcined at 500° C. for 5 hours) in 110 litres of hexane was made up in a 240 litre vessel under nitrogen and 3.0 g of Stadis 425 (diluted in 1 litre hexane) was added. A solution of TEA in hexane (30.0 moles, 0.940M solution) was added slowly to the stirred suspension over 30 minutes, while maintaining the temperature of the suspension at 30° C. The suspension was stirred for a further 2 hours. The hexane was decanted, and the silica washed with hexane, so that the aluminium content in the final washing was less than 1 mmol Al/litre. Finally the suspension was dried in vacuo at 60° C. to give a free flowing treated silica powder.

(ii) Production of Catalyst

Toluene dried over molecular sieves (350 ml) was added to 100 g of the treated silica powder in a large Schlenk tube in a dry nitrogen glove box. The tube was shaken well to form a suspension and left to stand for 1 hour. To the suspension was added a solution of tris(pentafluorophenyl) boron in toluene (11.3 ml, 7.85 wt. %, d=0.88 g/ml) by syringe. Then rac ethylene bis indenyl zirconocene 1-4 diphenyl butadiene (0.845 g) was added. The suspension was shaken well for 5 minutes, then dried in vacuo at ambient temperature to give a free-flowing pink/red powder.

(iii) Gas-phase Fluidised bed Production of an Ethyene/Hexene-1 Copolymer

Ethylene, hexene-1, hydrogen and nitrogen were polymerised using a 15 cm diameter continuous fluidised bed reactor system. Polymer product was removed at regular intervals from the reactor. Operating conditions are given in Table 1. The product was a white free flowing powder.

EXAMPLES 2 AND 3

Preparation and Use of Zr(II) Catalysts (i) Treatment of the Silica Support 110 litres of hexane was placed in a 240 litre vessel under nitrogen and 1.7 g of Stadis 425 (diluted at 1 wt. % in hexane) was added. 11 kg of ES70 Crossfield silica (previously dried at 500° C. for 5 hours) was then added. 16.5 moles of TEA (0.87 mole in hexane) was then added at 30° C. during a period of 30 minutes. After a holding period of 2 hours, the hexane was decanted and the silica was washed 6 times with 130 litres of hexane.

(ii) Production of the Catalyst

The silica treated as above was dried and then 38 litres of toluene added. 11.7 kg of rac ethylene bis indenyl zirconocene 1-4 diphenyl butadiene solution in toluene (1.32 wt %) was added at ambient temperature during a period of 15 minutes. 0.7 g of Stadis 425 (diluted at 1 wt % in toluene) was added. The catalyst was then dried under vacuum (4 mmHg) at 40° C. to give a free flowing powder.

Then 2.33 kg of tris pentafluorophenyl boron solution (6.12 wt % in toluene) was added at ambient temperature during a period of 2 hours while maintaining continuous agitation. After a holding period of 1 hour again maintaining agitation a pink/red catalyst having residual solvent therein was obtained.

(iii) Gas-phase Fluidised Bed Production of an Ethylene/Hexene-1 Copolymer

Ethylene, hexene-1, hydrogen and nitrogen were fed into a 45 cm diameter continuous fluidised bed reactor. Polymer product was continuously removed from the reactor. Operating conditions are given in Table 1:

EXAMPLE 4

(i) Treatment of Silica

A suspension of ES70 silica (16 kg, previously calcined at 500° C. for 5 hours) in 110 litres of hexane was made up in a 240 litre vessel under nitrogen. 1.7 g of Stadis 425 diluted in 1 L of hexane was added. A solution of TEA in hexane (24.0 moles, 1.0M solution) was added slowly to the stirred suspension over 30 minutes, while maintaining the temperature of the suspension at 30° C. The suspension was stirred for a further 2 hours. The hexane was filtered, and the silica washed with hexane, so that the aluminium content in the final washing was less than 1 mmol Al/litre. Finally the suspension was dried in vacuo at 60° C. to give a free flowing treated silica powder.

(ii) Catalyst Fabrication 41.6 L of toluene was added to the above treated silica powder. 12.67 kg of rac ethylene bis indenyl zirconocene 1-4 diphenyl butadiene solution in toluene (1.16 wt %) was added at ambient temperature during a period of 15 min then kept at 25° C. for 15 min. 50 ppm of Stadis 425 diluted in 1 L of toluene was added. The catalyst was then dried under vacuum at 40° C. to give a free flowing powder.

Then 2.22 Kg of tris(pentafluorophenyl)boron solution in toluene (6.12 wt %) was added at ambient temperature during a period of 2 hours while maintaining continuous agitation After a holding period of 1 h again maintaining agitation a catalyst having residual solvent therein was obtained.

(iii) Gas Phase Fluidised Bed Production of an Ethylene-hexene-1 Copolymer

The polymerisation was carried out as for Example 1, under conditions summarised in Table 1

EXAMPLE 5

(i) Treatment of Silica 26.24 Kg of TEA treated ES70 silica was prepared in a dryer under nitrogen essentially as described in Example 4.

(ii) Catalyst Fabrication 10 litres of 0.0809M solution in toluene of bis (hydrogenated tallow alkyl) methyl ammonium tris (pentafluorophenyl)(4-hydroxyphenyl)borate, was mixed with 0.9 litres of TEA (1.01M) in toluene. The mixture was added to the treated silica with agitation and allowed to mix for 45 minutes. The solvent was removed during 1 hour under vacuum at a temperature of 31° C. 25 litres of 0.021M rac ethylene bis indenyl zirconocene 1-4 diphenyl butadiene in toluene was added and allowed to mix for 45 minutes. The solvent was removed during 105 minutes under vacuum at 34° C. The finished catalyst was steel-grey in colour and contained less than 0.25% residual solvent.

(iii) Gas Phase Fluidised Bed Production of an Ethylene-hexene-1 Copolymer

The polymerisation was carried out as for Examples 2 and 3, under conditions summarised in Table 1

EXAMPLE 6

(i) Treatment of Silica Support

A suspension of ES70 silica (16 kg, previously calcined at 500° C. for 5 hours) in 110 litres of hexane was made up in a 240 litre vessel under nitrogen. 1.7 g of a solution of Stadis 425 (in 1 litre of hexane) was added. A solution of TEA in hexane (24.0 moles, 0.838M solution) was added slowly to the stirred suspension over 30 minutes, while maintaining the temperature of the suspension at 30° C. The suspension was stirred for a further 2 hours. The hexane was filtered, and the silica washed with hexane, so that the aluminium content in the final washing was less than 0.5 mmol Al/litre.

Finally the suspension was dried in vacuo at 60° C. to give a free flowing treated silica powder.

(ii) Production of the Catalyst

All manipulations were done under an inert nitrogen atmosphere in a dry box. To 64.5 mL of a 0.073M solution in toluene of bis(hydrogenated tallow allyl) methyl ammonium tris(pentafluorophenyl)(4-hydroxyphenyl)borate, was added 20.8 mL of 0.25 M $Et_3Al$ in toluene. 84.7 mL of this mixture was quantitatively added to 150 g of treated silica in a 3 L Round bottom flask and the resulting mixture was agitated for 30min at ambient temperature. The solvent was removed under vacuum at 30° C. to the point where no further evolution of volatiles was observed. Immediately after, 138.3 mL of 0.017M rac ethylene bis tetrahydro indenyl zirconocene 1-4 diphenyl butadiene in toluene were added and the powder was again agitated for 30 min at ambient temperature. The solvent was removed under vacuum at ambient temperature to the point where no further evolution of volatiles was observed.

(iii) Gas Phase Fluidised Bed Production of an Ethylene-hexene-1 Copolymer

The polymerisation was carried out as for Example 1, under conditions summarised in Table 1

EXAMPLE 7

All manipulations were done under an inert nitrogen atmosphere in a dry box.

(i) Treatment of Silica

Twenty grams of Crosfield ES-70 silica that were calcined in air at 500° C. were accurately weighed into a 250 mL Schlenk flask. 125 mL of hexane were added to make a slurry. 30.8 mL of 1.0 M TEA in hexane were added while swirling the flask by hand and the flask was left to stand for 1 hour. The treated silica was filtered on a frit and washed with several volumes of hexane. The silica was dried to constant weight under vacuum at ambient temperature. 21.7 g of treated silica were recovered (ii) Production of Catalyst Two grams of the above treated silica were accurately weighed into a 100 mL Schlenk flask and 8 cc of toluene were added to make a slurry. 2.4 ML of 0.017 M rac ethylene bis tetrahydro indenyl zirconocene 1-4 diphenyl butadiene in toluene and 0.5 mL of 0.127 M tris(pentafluorophenyl)boron were added, in that order, while swirling the flask by hand. The solvent was.removed till constant weight, under vacuum at ambient temperature. 1.9 g of catalyst powder were recovered.

(iii) Gas Phase Production of an Ethylene-hexene-1 Copolymer

The polymerisation was carried out in a 2.5-litre stirred, fixed bed autoclave. This was charged with 300 g dry NaCl, and stirring was begun at 300 rpm. The reactor was pressurised to 8.39 bar ethylene that contained 500 ppm volume of hydrogen and heated to 71° C. 1-hexene was introduced to a level of 6000 ppm volume as measured on a mass spectrometer. 0.5 g of TEA was introduced into the reactor. In a separate vessel, 0.1 g catalyst was mixed with an additional 0.5 g TEA treated silica. The combined catalyst and TEA treated silica were subsequently injected into the reactor. Ethylene pressure was maintained on a feed as demand, and hexene was fed as a liquid to the reactor to maintain the ppm concentration. Temperature was regulated by dual heating and cooling baths. After 180 minutes the reactor was depressurised, and the salt and polymer were removed via a dump valve. The polymer was washed with copious distilled water to remove the salt, then dried at 50° C. 282 g of a white polymer powder was recovered.

TABLE 1

|  | Example 1 | Example 2 | Example 3 | Example 4 | Example 5 | Example 6 |
|---|---|---|---|---|---|---|
| Total pressure (bar) | 14.3 | 19 | 19 | 14.3 | 18 | 14.5 |
| Temperature (° C.) | 70 | 70 | 70 | 70 | 65 | 70 |
| C2 pressure (bar) | 12 | 11.8 | 10 | 8 | 8.5 | 4 |
| H2/C2 | 0.0005 | 0.0005 | 0.0014 | 0.0003 | 0.00056 | 0.0006 |
| C6/C2 | 0.007 | 0.0061 | 0.0055 | 0.007 | 0.0057 | 0.0075 |
| Production (Kg/h) | 1.3 | 43 | 39 | 1 | 100 | 0.7 |

TABLE 2

| Property Polymers | MFR (2.16 kg) (g/10 min) | Density (Å) (kg/m^3) | Mw/Mn | <g'>LCB | Ea (kJ/mol) | h (500/s) (Pa · s) | MS (500/s) (cN) | P (500/s) (MPa) | d(MS)/d(logγ) (cN) | d(MS)/d(P) (cN/MPa) |
|---|---|---|---|---|---|---|---|---|---|---|
| Example 1 | 1.1 | 920 | 5.9 | 0.68 | 65.1 | 260 | 16.7 | 15.6 | 9.22 | 0.81 |
| Example 2 | 0.3 | 920 | 5.0 | 0.74 | 74.1 | 290 | 19.3 | 17.5 | 8.62 | 0.85 |
| Example 3 | 1.0 | 923 | 5.3 | 0.77 | 67.0 | 220 | 16.2 | 14.4 | 9.19 | 0.85 |
| Example 4 | 0.9 | 920.3 | 5.3 | 0.80 | 65.4 | 240 | 17.7 | 14.7 | 11.10 | 1.04 |
| Example 5 | 1.1 | 917.9 | 3.6 | — | 62.4 | 385 | 10.0 | 17.8 | 5.81 | 0.50 |
| Example 6 | 1.3 | 921.4 | 3.5 | — | 56.7 | 400 | 6.3 | 18.6 | 4.03 | 0.37 |
| Example 7 | 0.66 | 926.8 | 3.7 | — | 66.7 | 455 | 5.0 | 13.7 | 3.13 | 0.33 |
| Exceed MLL27MAX | 0.85 | 926 | 2.3 | 1.0 | — | 690 | 4.4 | 32.0 | 2.11 | 0.13 |
| Exceed 350D60 | 1.12 | 917.7 | 2.1 | — | 30.8 | 760 | 4.0 | 31.0 | 1.77 | 0.11 |
| Dowlex 2045 | 1.1 | 919 | 3.3 | — | 32.0 | 580 | 5.5 | 23.0 | 2.00 | 0.15 |
| MOBIL NTA 101 | 0.84 | 920 | 3.4 | — | 31.0 | 515 | 4.8 | 25.0 | 2.15 | 0.16 |
| LL7209AA | 0.9 | 920 | 3.8 | — | 31.3 | 570 | 6.3 | 24.4 | 2.85 | 0.22 |
| LL7206AF | 0.6 | 920 | 3.9 | — | 31.0 | 600 | 9.5 | 27.0 | 4.19 | 0.33 |
| Borealis LE6592 | 0.15 | 922.9 | 11.5 | — | — | 370 | 15.0 | 20.0 | 6.25 | 0.70 |
| Affinity FM 1570 | 1.0 | 915 | 2.2 | 0.92 | 60.8 | 570 | 5.5 | 24.0 | 2.64 | 0.19 |
| EBI/Zr(IV)/MAO | 0.77 | 918.3 | 3.4 | 0.85 | 60.2 | 440 | 13.0 | 19.5 | 7.38 | 0.59 |
| LD5320AA | 2.1 | 921 | 6.8 | 0.59 | 57.8 | 240 | 14.5 | 12.8 | 11.88 | 1.05 |
| LD5310AA | 1.0 | 923 | 7.0 | 0.53 | 65.3 | 300 | 16.6 | 14.0 | 8.67 | 1.07 |

Film Tests

Film was produced from the product of example 2 and LD5310AA using a Collin single screw film extruder (45 mm, 25L/A) equipped with an LDPE screw and using a temperature profile typical of that used for extrusion of LDPE. The results are summarised in Table 3 together with results for examples 8–10 which were produced under similar catalyst and polymerisation conditions to example 2.

It can be seen that for all of the example polymers that the extrusion behaviour is improved compared to the control LDPE product as judged by their lower extrusion head pressure, lower motor load and lower specific energy. In addition, this has been achieved for products with melt indices lower than the conventional LDPE ie products which might be expected to show more difficult extrusion behaviour. At the same time, mechanical properties similar to LDRE or improved have been obtained.

Similar film extrusions have been carried out for examples 5 and 6 and these are reported in Table 4. For these products, the processing is less advantageous compared to LDPE, as evidenced by the values for head pressure, motor load and specific energy, but the mechanical are considerably better than LDPE and the optical properties are comparable.

Film Test Methods

Film dart impact was measured according to ASTM D1709, (Method A) teas strength by ASTM D1922, and tensile properties by ASTM D822. Haze was measured by ASTM D1003 and gloss by D2457.

TABLE 3

| Example | 2 | 8 | 9 | 10 | LD5310AA |
|---|---|---|---|---|---|
| Compounding | | | | | |
| Machine | ZSK53 | ZSK58 | ZSK58 | ZSK58 | |
| CaSt ppm | 1250 | 1250 | 1250 | 1250 | |
| Irganox 1076 ppm | 500 | 500 | 500 | 500 | |
| Irgafos PEPQ ppm | 800 | 800 | 800 | 800 | |
| Pellet properties | | | | | |
| Melt Index g/10 min | 0.31 | 0.32 | 1.38 | 0.68 | 0.9 |
| Density Kg/m3 | 920 | 922.9 | 922 | 919.5 | 921 |
| I21/I2 | 95 | 84 | 51 | 69 | 62 |
| Film extrusion | | | | | |
| Machine | Collin | Collin | Collin | Collin | Collin |
| Die mm | 100 | 100 | 100 | 100 | 100 |
| Die gap mm | 0.8 | 0.8 | 0.8 | 0.8 | 0.8 |
| T° Profil | 175/190/ 195/200/ 200/200/ 210/210 | 140/150/ 160/170/ 170/170/ 190/180 | 140/150/ 160/170/ 170/170/ 190/180 | 140/150/ 160/170/ 170/170/ 190/180 | 140/150/ 160/170/ 170/170/ 190/180 |
| Screw speed rpm | 40 | 40 | 41 | 40 | 45 |
| Melt pressure bar | 151 | 238 | 166 | 187 | 245 |
| Output Kg/h | 12 | 12 | 12 | 12 | 12 |
| Motor Load Å | 10.7 | 14.5 | 11.7 | 13.9 | 13.6 |
| Melt Temp. °C. | 190 | 165 | 161 | 162 | 163 |
| Haul off rate m/mn | 10.2 | 8.8 | 11 | 9.1 | 10 |
| BUR | 2:1 | 2:1 | 2:1 | 2:1 | 2:1 |
| Frostline mm | 250 | 160 | 120 | 350 | 120 |
| Specific energy Kwh/Kg | 0.12 | 0.17 | 0.14 | 0.16 | 0.18 |
| Film properties | | | | | |
| Thickness um | 38 | 38 | 38 | 39–41 | 38 |
| Dart impact g | 160 | 205 | 103 | 170 | 140 |
| MD tens. st. break MPa | | | 23.5 | | 36 |
| TD tens. st. break MPa | | | 24 | | 25 |
| MD elongation % | | | 520 | | 350 |
| TD elongation % | | | 650 | | 710 |

TABLE 4

| Example | LD5310AA | 5 | 6 |
|---|---|---|---|
| Compounding | | | |
| Machine | | ZSK58 | ZSK53 |
| CaSt ppm | | 1250 | 1250 |
| Irganox 1076 ppm | | 500 | 500 |
| Irgafos PEPQ ppm | | 800 | 800 |
| Pellet properties | | | |
| Melt Index g/10 min | 0.85 | 0.52 | 1.29 |
| Density Kg/m3 | 921 | 918.3 | 921.4 |
| I21/I2 | 61 | 65.4 | 40 |
| Film extrusion | | | |
| Machine | Collin | Collin | Collin |
| Die mm | 100 | 100 | 100 |
| Die gap mm | 0.8 | 0.8 | 0.8 |
| T° Profil | 140/150/ 160/170/ 170/170/ 190/180 | 140/150/ 160/170/ 170/170/ 190/180 | 140/150/ 160/170/ 170/170/ 190/180 |

TABLE 4-continued

| Example | LD5310AA | 5 | 6 |
|---|---|---|---|
| Screw speed rpm | 44 | 42 | 42 |
| Melt pressure bar | 224 | 273 | 297 |
| Output Kg/h | 12 | 12 | 12 |
| Motor Load Å | 15.3 | 16.7 | 17.2 |
| Melt Temp. °C. | 155 | 153 | 157 |
| Haul off rate m/mn | 9.6 | 9.6 | 9.3 |
| BUR | 2:1 | 2:1 | 2:1 |
| Frostline mm | 350 | 350 | 350 |
| Specific energy kWh/Kg | 0.19 | 0.20 | 0.21 |
| Film properties | | | |
| Thickness um | 38 | 38 | 38 |
| Dart impact g | 102 | 360 | 252 |
| Haze % | 5 | 10.7 | 8.1 |
| Gloss o/oo | 72 | 50 | 61 |

I claim:

1. A copolymer comprising ethylene and one or more alpha olefins containing from three to twenty carbon atoms, said copolymer having:
   a) a long chain branching g' value in the range of 0.65 to 0.8 and
   b) a value of the derivative function $\delta(MS)/\delta(P)$ of greater than 0.6 wherein MS is the melt strength of the copolymer in cN and P is the extrusion pressure of the copolymer in MPa.

2. A copolymer as claimed in claim 1 wherein $\delta(MS)/\delta(P)$ is greater than 0.65.

3. A copolymer as claimed in claim 2 wherein $\delta(MS)/\delta(P)$ is greater than 0.80.

4. A copolymer as claimed in claim 2 wherein $\delta(MS)/\delta(P)$ is in the range greater than 0.65 to less than 1.4.

5. A copolymer as claimed in claim 2 wherein $\delta(MS)/\delta(P)$ is in the range from 0.8 to 1.2.

6. A copolymer comprising ethylene and one or more alpha olefins containing from three to twenty carbon atoms, said copolymer having:
   a) a long chain branching g' value in the range of 0.65 to 0.8 and
   b) a value of the derivative function $\delta(MS)/\delta(\log \dot{\gamma})$ of greater than 7.5 wherein MS is the melt strength of the copolymer in cN and $\dot{\gamma}$ is the shear rate of the copolymer in secs$^{-1}$.

7. A copolymer as claimed in claim 6 wherein $\delta(MS)/\delta(\log \dot{\gamma})$ is greater than 8.0.

8. A copolymer as claimed in claim 6 wherein $\delta(MS)/\delta(\log \dot{\gamma})$ is from 8.0 to 12.0.

9. A homopolymer of ethylene or a copolymer of ethylene and one or more alpha olefins containing from three to twenty carbon atoms said homopolymer or copolymer having:
   a) a value of the derivative function $\delta(MS)/\delta(P)$ of greater than 0.6 and
   b) an $M_w/M_n$ value of less than 6 wherein MS is the melt strength of the copolymer or homopolymer in cN and P is the extrusion pressure of the copolymer or homopolymer in MPa and $M_w/M_n$ is the ratio of weight average molecular weight to number average molecular weight of the copolymer or homopolymer as measured by gel permeation chromatography.

10. A homopolymer or copolymer as claimed in claim 9 wherein $\delta(MS)/\delta(P)$ is greater than 0.8.

11. A homopolymer or copolymer as claimed in claim 9 wherein $\delta(MS)/\delta(P)$ is greater than 0.75.

12. A homopolymer or copolymer as claimed in claim 9 wherein $\delta(MS)/\delta(P)$ is in the range greater than 0.8 to 1.2.

13. A homopolymer of ethylene or a copolymer of ethylene and one or more alpha olefins containing from three to twenty carbon atoms said homopolymer or copolymer having:
   a) a value of the derivative function $\delta(MS)/\delta(\log \dot{\gamma})$ of greater than 7.5 and
   b) an $M_w/M_n$ value of less than 6.5
      wherein MS is the melt strength of the copolymer in cN and $\dot{\gamma}$ is the shear rate of the copolymer in secs$^{-1}$ and $M_w/M_n$ is the ratio of weight average molecular weight to number average molecular weight as measured by gel permeation chromatography.

14. A homopolymer or copolymer as claimed in claim 13 wherein $\delta(MS)/\delta(\log \dot{\gamma})$ is greater than 8.0.

15. A homopolymer or copolymer as claimed in claim 13 wherein $\delta(MS)/\delta(\log \dot{\gamma})$ is from 8.0 to 12.0.

16. A homopolymer of ethylene or a copolymer of ethylene and one or more alpha olefins containing from three to twenty carbon atoms said homopolymer or copolymer having a long chain branching g' value of between 0.65 to 0.8.

17. A homopolymer or copolymer as claimed in any one of claims 9, 13, or 16 obtained by continuously polymerising ethylene alone or with one or more alpha olefins having from three to twenty carbon atoms in the gas phase in a single reactor containing a fluidised bed of polymer particles, said polymerisation being carried out in the presence of a single metallocene catalyst.

18. A homopolymer or copolymer as claimed in claim 17 obtained by continuously polymerising ethylene alone or with or more alpha olefins having from three to twenty carbon atoms in the gas phase in a reaction system comprising a single reactor containing a fluidised bed of polymer particles, a recycle loop connecting the inlet and outlet of the reactor and means for withdrawing the homopolymer or copolymer either continuously or periodically from the reactor whilst polymerisation is occurring, said polymerisation being carried out in the presence of a single metallocene catalyst.

19. A homopolymer or copolymer as claimed in 17 obtained by continuously polymerising ethylene alone, or with one or more alpha olefins having from three to twenty carbon atoms in the gas phase in a single reactor containing a fluidized bed of polymer particles, said polymerisation being carried out in the presence of a single metallocene catalyst having the following general formula:

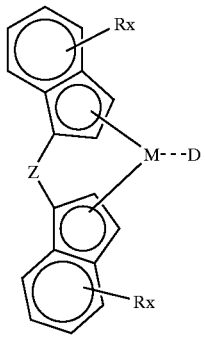

wherein
- M is titanium, zirconium or hafnium,
- D is a stable conjugated diene optionally substituted with one or more hydrocarbyl groups, silyl groups, hydrocarbylsilyl groups, silylhydrocarbyl groups or mixtures thereof, said D having from 4 to 40 non-hydrogen atoms and forming a π-complex with M,
- Z is a bridging group comprising an alkylene group having 1–20 carbon atoms or a dialkyl silyl- or germanyl group or alkyl phosphine or amino radical,
- R is hydrogen or alkyl having from 1 to 10 carbon atoms and x is 1–6.

20. A homopolymer or copolymer as claimed in 17 obtained by continuously polymersing ethylene alone or with one or more alpha olefins having from three to twenty carbon atoms in the gas phase in a single reactor containing a fluidised bed of polymer particles said polymerisation being carried out in the presence of a single metallocene catalyst having the following general formula:

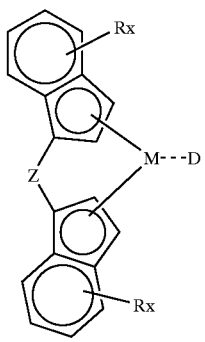

wherein
- M is titanium, zirconium or hafnium in the +2 oxidation state,
- D is a stable conjugated diene selected from the group consisting of s-trans-$\eta^4$,4-diphenyl-1,3-butadiene; s-trans-$\eta^4$-3-methyl-1,3-pentadiene; s-trans-$\eta^4$-1,4-dibeizy-1,3-butadiene; s-trans-$\eta^4$2,4-hexadiene; s-trans-$\eta^4$-1,4-ditolyl-1,3-butadiene, s-trans-$\eta^4$-1,4-bis(trimethylsilyl)-1,3-butadiene; s-cis-$\eta^4$-1,4-diphenyl-1,3-butadiene; s-cis-$\eta^4$-3-methyl-1,3-pentadiene; s-cis-$\eta^4$2,4-hexadiene; s-cis-$\eta^4$2,4-hexadiene; s-cis-$\eta^4$1,3-pentadiene; s-cis-$\eta^4$-1,4-ditolyl-1,3-butadiene; and s-cis-$\eta^4$-bis(trimethylsilyl)-1,3-butadiene, said s-cis diene group forming a π-complex as defined herein with the metal,
- Z is a bridging group comprising an alkylene group having 1–20 carbon atoms or a dialkyl silyl- or germanyl group or alkyl phosphine or amino radical,
- R is hydrogen or alkyl having from 1 to 10 carbon atoms and x is 1–6.

21. A homopolymer or copolymer as claimed in 17 obtained by continuously polymerising ethylene and, in the case of copolymerising, one or more alpha olefins having from three to twenty carbon atoms in the gas phase in a single reactor containing a fluidised bed of polymer particles said polymerisation being carried out in the presence of a single metallocene catalyst having the following formula:

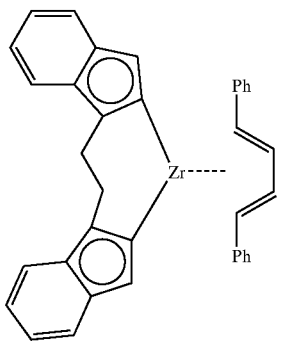

22. A film exhibiting a dart impact value measured by ASTM D-1709 (Method A) in the range about greater than 100 and up to about 2000 comprising a copolymer as claimed in claims 1, 6, 9, 13, or 16.

23. A film exhibiting a dart impact value measured by ASTM-D1709 (Method A) in the range about greater than 100 and up to about 2000 comprising a copolymer of ethylene and an alpha-olefin of from 3 to 10 carbon atoms which has a density of from 0.910–0.930, a $I_{21}/I_2$ value of $\geq 35$, a long chain branching g' value in the range of 0.65 to 0.8 and a value of the derivative function $\delta(MS)/\delta(P)$ of greater than 0.6.

24. A copolymer obtained by continuously polymerising ethylene with one or more alpha olefins having from three to twenty carbon atoms in the gas phase in a single reactor containing a fluidised bed of polymer particles, said copolymer having:

a) a long chain branching g' value of less than or equal to 0.9 and b) a value of the derivative function $\delta(MS)/\delta(P)$ of greater than 0.6 wherein MS is the melt strength of the copolymer in cN and P is the extrusion pressure of the copolymer in MPa, and said polymerisation being carried out in the presence of a single metallocene catalyst having the following general formula:

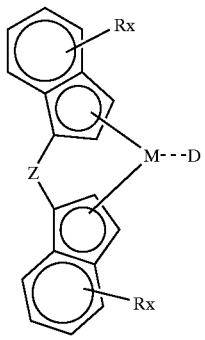

wherein

M is titanium, zirconium or hafnium in the +2 oxidation state,

D is a stable conjugated diene selected from the group consisting of s-trans-η⁴,4-diphenyl-1,3-butadiene; s-trans-η⁴-3-methyl-1,3-pentadiene; s-trans-η⁴-1,4-dibeizy-1,3-butadiene; s-trans-η⁴-2,4-hexadiene; s-trans-η⁴-1,4-ditolyl-1,3-butadiene, s-trans-η⁴-1,4-bis(trimethylsilyl)-1,3-butadiene; s-cis-η⁴-1,4-diphenyl-1,3-butadiene; s-cis-η⁴-3-methyl-1,3-pentadiene; s-cis-η⁴-2,4-hexadiene; s-cis-η⁴-2,4-hexadiene; s-cis-η⁴1,3-pentadiene; s-cis-η⁴-1,4-ditolyl-1,3-butadiene; and s-cis-η⁴-bis(trimethylsilyl)-1,3-butadiene, said s-cis diene group forming a π-complex as defined herein with the metal, Z is a bridging group comprising an alkylene group having 1–20 carbon atoms or a dialkyl silyl- or germanyl group or alkyl phosphine or amino radical, R is hydrogen or alkyl having from 1 to 10 carbon atoms and x is 1–6.

25. A copolymer as claimed in claim 24 wherein g' is less than or equal to 0.8.

26. A copolymer as claimed in claim 24 wherein g' is in the range 0.5 to 0.9.

27. A copolymer as claimed in claim 26 wherein g' is in the range 0.55 to 0.85.

28. A copolymer as claimed in claim 27 wherein g' is in the range of 0.65 to 0.8.

29. A copolymer as claimed in claim 24 wherein δ(MS)/δ(P) is greater than 0.65.

30. A copolymer as claimed in claim 29 wherein δ(MS)/δ(P) is greater than 0.80.

31. A copolymer as claimed in claim 29 wherein δ(MS)/δ(P) is in the range greater than 0.65 to less than 1.4.

32. A copolymer as claimed in claim 29 wherein δ(MS)/δ(P) is in the range from 0.8 to 1.2.

33. A copolymer obtained by continuously polymerising ethylene with one or more alpha olefins having from three to twenty carbon atoms in the gas phase in a single reactor containing a fluidised bed of polymer particles, said copolymer having:

a) a long chain branching g' value of less than or equal to 0.9 and b) a value of the derivative function δ(MS)/δ(log γ̇) of greater than 7.5 wherein MS is the melt strength of the copolymer in cN and γ̇ is the shear rate of the copolymer in secs⁻¹, and said polymerization being carried out in the presence of a single metallocene catalyst having the following general formula:

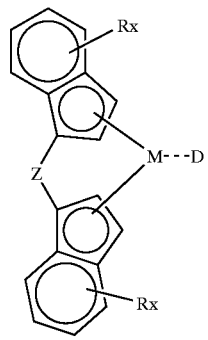

wherein

M is titanium, zirconium or hafnium in the +2 oxidation state,

D is a stable conjugated diene selected from the group consisting of s-trans-η⁴,4-diphenyl-1,3-butadiene; s-trans-η⁴-3-methyl-1,3-pentadiene; s-trans-η⁴-1,4-dibeizy-1,3-butadiene; s-trans-η⁴-2,4-hexadiene; s-trans-η⁴-1,4-ditolyl-1,3-butadiene, s-trans-η⁴-1,4-bis(trimethylsilyl)-1,3-butadiene; s-cis-η⁴-1,4-diphenyl-1,3-butadiene; s-cis-η⁴-3-methyl-1,3-pentadiene; s-cis-η⁴-2,4-hexadiene; s-cis-η⁴2,4-hexadiene; s-cis-η⁴1,3-pentadiene; s-cis-η⁴-1,4-ditolyl-1,3-butadiene; and s-cis-η⁴-bis(trimethylsilyl)-1,3-butadiene, said s-cis diene group forming a π-complex as defined herein with the metal, Z is a bridging group comprising an alkylene group having 1–20 carbon atoms or a dialkyl silyl- or germanyl group or alkyl phosphine or amino radical, R is hydrogen or alkyl having from 1 to 10 carbon atoms and x is 1–6.

34. A copolymer as claimed in claim 33 wherein g' is less than or equal to 0.8.

35. A copolymer as claimed in claim 33 wherein g' is in the range 0.5 to 0.9.

36. A copolymer as claimed in claim 35 wherein g' is in the range 0.55 to 0.85.

37. A copolymer as claimed in claim 36 wherein g' is in the range of 0.65 to 0.8.

38. A copolymer as claimed in claim 33 wherein δ(MS)/δ(log γ̇) is greater than 8.0.

39. A copolymer as claimed in claim 33 wherein δ(MS)/δ(log γ̇) is from 8.0 to 12.0.

* * * * *

UNITED STATES PATENT AND TRADEMARK OFFICE
CERTIFICATE OF CORRECTION

PATENT NO. : 6,518,385 B1
DATED : February 11, 2003
INVENTOR(S) : Choon Kooi Chai It is certified that error appears in the above-identified patent and that said Letters Patent is hereby corrected as shown below:

Column 22,
Line 47, "with or" should read -- with one or --.
Line 59, "in 17" should read -- in claim 17 --.
Line 60, "alone, or" should read -- alone or --.

Column 23,
Line 31, "in 17" should read -- in claim 17 --.
Line 32, "polymersing" should read -- polymerising --.
Lines 62-63, "s-trans-$\eta^4$-1,4-dibeizy-1,3-butadiene;" should read -- s-trans-$\eta^4$-1,4-dibenzyl-1,3-butadiene; --.

Column 24,
Line 12, "in 17" should read -- in claim 17 --.

Column 25,
Lines 21-22, "s-trans-$\eta^4$-1,4-dibeizy-1,3-butadiene;" should read -- s-trans-$\eta^4$-1,4-dibenzyl-1,3-butadiene; --.

Column 26,
Lines 29-30, "s-trans-$\eta^4$-1,4-dibeizy-1,3-butadiene;" should read -- s-trans-$\eta^4$-1,4-dibenzyl-1,3-butadiene; --.

Signed and Sealed this

Sixteenth Day of December, 2003

JAMES E. ROGAN
*Director of the United States Patent and Trademark Office*